United States Patent
Bakken et al.

(10) Patent No.: US 10,175,033 B2
(45) Date of Patent: Jan. 8, 2019

(54) SYSTEM AND METHOD FOR DETERMINING THE POSITION OF A BULLET PROJECTILE ON A TARGET PLANE

(71) Applicant: Megalink AS, Drøbak (NO)

(72) Inventors: Leif Erik Bakken, Drøbak (NO); Pål Bakken, Drøbak (NO)

(73) Assignee: MEGALINK AS, Drobak (NO)

( * ) Notice: Subject to any disclaimer, the term of this patent is extended or adjusted under 35 U.S.C. 154(b) by 293 days.

(21) Appl. No.: 14/914,858

(22) PCT Filed: Sep. 5, 2014

(86) PCT No.: PCT/NO2014/050163
§ 371 (c)(1),
(2) Date: Feb. 26, 2016

(87) PCT Pub. No.: WO2015/047099
PCT Pub. Date: Apr. 2, 2015

(65) Prior Publication Data
US 2016/0209183 A1 Jul. 21, 2016

(30) Foreign Application Priority Data
Sep. 27, 2013 (NO) .................................. 20131296

(51) Int. Cl.
F41J 5/02 (2006.01)
G01P 3/68 (2006.01)
(52) U.S. Cl.
CPC ................ *F41J 5/02* (2013.01); *G01P 3/685* (2013.01)
(58) Field of Classification Search
CPC ................ F41J 5/02; F41J 5/08; G01P 3/685
See application file for complete search history.

(56) References Cited

U.S. PATENT DOCUMENTS 3,487,226 A * 12/1969 Conner ...................... F41J 5/02
250/222.1
3,727,069 A * 4/1973 Crittenden, Jr. ........... F41J 5/02
250/206.2
(Continued)

FOREIGN PATENT DOCUMENTS

CN 102192682 6/2013
CN 101929824 9/2013

OTHER PUBLICATIONS

International Search Report dated Nov. 17, 2014 in corresponding International Application No. PCT/NO2014/050163.
(Continued)

Primary Examiner — Dmitry Suhol
Assistant Examiner — Carl V Larsen
(74) Attorney, Agent, or Firm — Wenderoth, Lind & Ponack, L.L.P.

(57) ABSTRACT

A method and system are provided for accurately determining the point of impact of a bullet on a shooting disc or target plane and optionally the position of the shooter, wherein a number of light curtains are used for registering time instants of the passage of the bullet projectile through predetermined light planes by detecting the shadow cast by the bullet. Differences between the measured times and/or the measured times themselves are then used for calculating the velocity of the bullet and the points at which the trajectory of the bullet intersects the light planes and the target plane, which may be arranged or located behind or in front of the target disc/target disc arrangement of the system having the particular pattern of light curtains, allowing for the calculation of the centre impact point of the bullet on the shooting disc or target plane in 3D.

11 Claims, 19 Drawing Sheets

(56) References Cited

U.S. PATENT DOCUMENTS

| | | | | |
|---|---|---|---|---|
| 4,763,903 | A | * | 8/1988 | Goodwin ................ F41J 5/02 250/222.1 |
| 4,770,527 | A | * | 9/1988 | Park .................... A63B 63/00 250/222.1 |
| 5,577,733 | A | * | 11/1996 | Downing ................ F41J 1/10 250/222.2 |
| 5,637,866 | A | | 6/1997 | Riener et al. |
| 6,414,747 | B1 | | 7/2002 | Hardy |
| 6,717,684 | B1 | | 4/2004 | Fikes et al. |
| 2002/0027190 | A1 | * | 3/2002 | Hellak .................. F41J 5/02 250/222.1 |
| 2004/0213502 | A1 | * | 10/2004 | Gauthier, Jr. ......... F41G 3/142 385/12 |
| 2005/0088645 | A1 | * | 4/2005 | Lee .................. A63B 24/0021 356/28 |
| 2011/0204145 | A1 | | 8/2011 | Odhner et al. |
| 2012/0194802 | A1 | | 8/2012 | Walti-Herter |

OTHER PUBLICATIONS

Norwegian Search Report dated Mar. 7, 2014 in corresponding Norwegian Application No. 20131296.
Supplementary European Search Report dated Mar. 28, 2017 in corresponding European Application No. 14 84 7982.

* cited by examiner

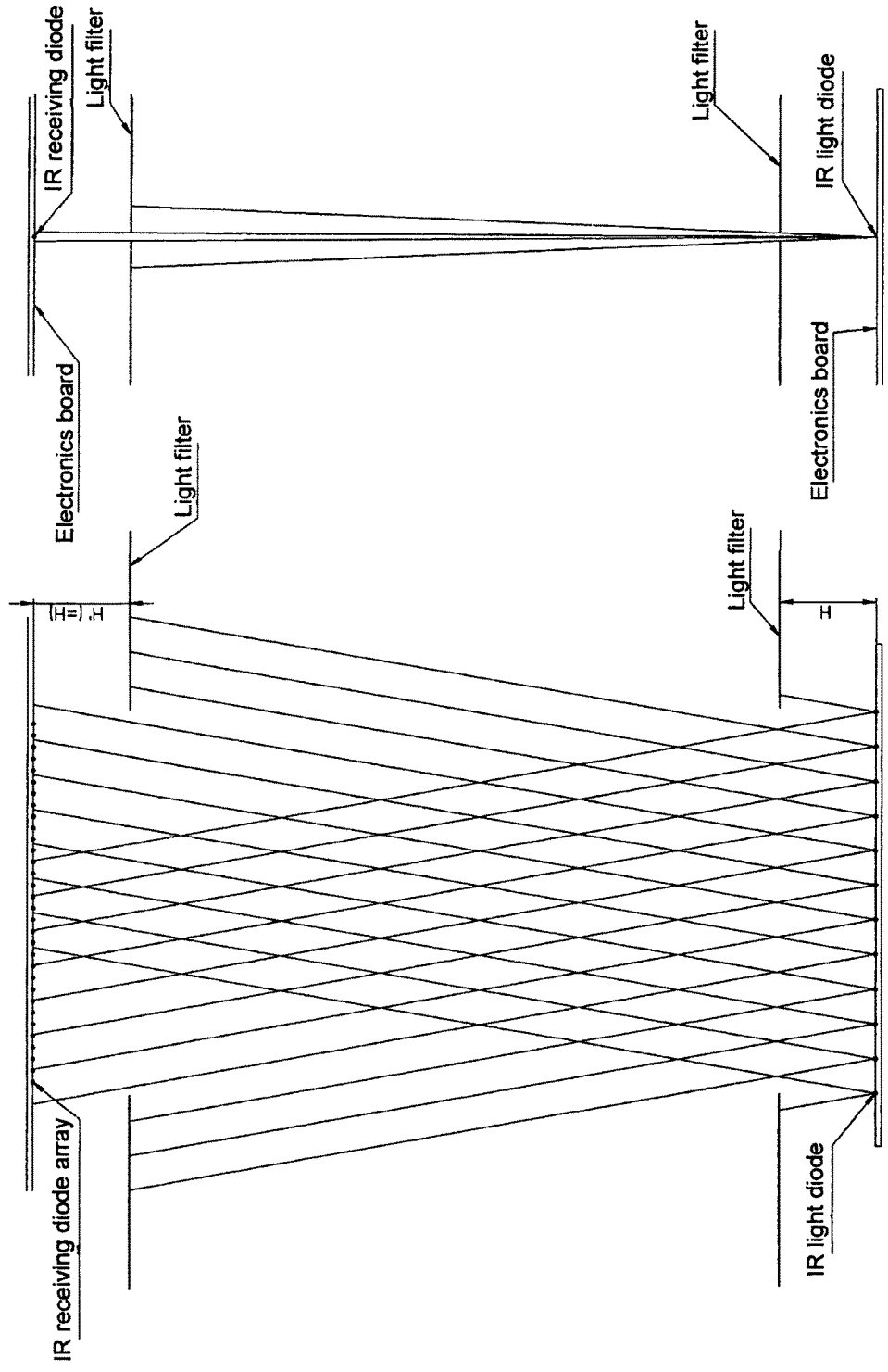

SYSTEM AND METHOD FOR DETERMINING THE POSITION OF A BULLET PROJECTILE ON A TARGET PLANE

The present invention relates to a method and system for accurately determining the point of impact of a bullet on a shooting disc or target plane and optionally the position of the shooter.

Similar prior art methods and systems for determining an impact point of a bullet on a target disc plane are not able to achieve sufficient accuracy. Particularly in short-range, small target shooting competitions this is important. To give an example, the accuracy requirement of ISSF (International Shooting Sport Federation) for 10 m air rifle is ±0.125 mm.

The proposed invention solves the above problem and provides a significant improvement in the accuracy of the indication of the impact point of the bullet.

The main features of the present invention are disclosed in the independent claims. Further features of the invention are defined by the dependent claims.

The main principle of the invention is the use of a plurality of light curtains, which may be formed by light diodes and light sensitive sensors and which are arranged in a predetermined pattern, for registering the times at which a bullet projectile passes through predetermined (light) planes by detecting the shadow cast thereby. Differences between the measured times, and/or the measured times themselves, are then used for calculating coordinates of the point(s) at which the bullet has passed through one or more light planes, to thereby be able to calculate the point at which the centre of the bullet has hit a target plane. The velocity of the bullet may also be calculated and used in the above calculation of the coordinates and hence the centre point of the bullet on the target plane. The target plane may be arranged or located behind or in front of the target disc/target disc arrangement of the system having the predetermined pattern of light curtains.

To calculate the impact point of the bullet on a target plane (for 3D planes), coordinates must be calculated on at least two axes. The explanation that follows only discusses the calculation of the coordinate on one of these axes (i.e. for 2D planes) as it is assumed that the other axis can be calculated in substantially the same manner. Even though, in some cases, it may be necessary to take into account the retardation of the bullet, typically based on empirically derived models, the present description will assume that the velocity of the bullet is constant across the entire target disc/target disc arrangement. Additionally, in this explanation, it is also assumed that the bullet trajectory is parallel to a calculation axis orthogonal to the target plane. Various methods exist for calculating the points at which the bullet has passed the light planes, but the simplest way of explaining this is as follows: Two parallel planes are used for calculating the velocity of the bullet along the calculation axis. A measurement of the time difference between the times at which the bullet passes the two parallel planes and information on the distance between the planes (along the calculation axis) enable this calculation. In addition, a measured time difference is needed between the times at which the bullet passes two planes that are not parallel to each other (relative to the coordinate axis). Since the velocity of the bullet is known, we can also determine the distance between the light planes along the calculation axis for the measured time difference. This allows us to determine where the bullet must have passed the light planes along the coordinate axis for this distance to result.

To further improve the accuracy in the location of light planes and/or in performing calculations one needs to take into account that the bullet has a width and shape, so that it is not necessarily the centre of the bullet that first passes through the light planes. The effect thereof can be eliminated by exploiting one or more of the following:

- The times measured using light planes located at an angle a and angle b=−a to the target plane will be time-shifted by the same amount, so that the time difference will be the same as for the centre of the bullet. In such cases calculations are performed directly along the centre of the bullet.
- By measuring time differences for the passage of the bullet through a reference plane parallel to the shooting disc or target plane relative to two planes located at an angle a and b=−a relative to the reference plane, a measure will be achieved on each side of the shadow width of the bullet. Using this technique one may form a measure for the shadow width of the bullet to thereby be able to calculate the centre of the bullet as a point midway between these edges.
- By assuming a given shape and size for the projectile or using empirically derived parameters this type of effects can be corrected to a certain extent.

Regarding accuracy, it shall also be noted that the bullet trajectory doesn't necessarily passes by parallel to the calculation axis (parallax error). This may be handled in several ways:

- Locating the light planes so as to be able to calculate points on a plane which is parallel to the target plane and which may be located sufficiently close thereto.
- Calculating several points along the bullet trajectory to be able to calculate the angle of the bullet trajectory in addition to coordinates. One may then, based on an assumption that the bullet trajectory is straight or follows a predetermined path, be able to extrapolate to arbitrary points along the bullet trajectory and thereby calculate the impact point of the bullet on a randomly located target plane, or from where the bullet was fired towards the target disc, under the assumption of a known shooting distance.

The invention relates to a system for determining an impact point of a bullet on a shooting disc or target plane, the system comprising a particular pattern of light planes including at least five light curtains or planes in three dimensions (3D), which form at least three light curtains or planes in two dimensions (2D), and at least one processor. The two-dimensional light curtains or planes are arranged or provided in such a manner that in one of two unknown coordinates of the centre of the impact point of the bullet on the shooting disc or target plane, at least two light planes will form at least one set or predetermined first angle to the shooting disc or target plane, said at least two light planes being arranged at a predetermined first distance from each other. The at least one processor is configured for providing for detection of at least two trigging points of a side of the bullet projectile or trajectory when the bullet first hits and/or exits each light plane, as well as at least two time measurements on such passages through said at least two light planes. The at least one processor is further configured for calculating the velocity of the bullet using the difference between the two of the time measurements of the passage of the bullet through the to light planes that are parallel to each other and arranged at the predetermined first distance from each other. Additionally, at least one light plane at one of two unknown coordinates of the centre of the impact point of the bullet on the shooting disc or target plane is located so as to not be parallel to said at least two light planes. The at least one processor is configured for providing for detection of at least one trigging point of the projectile or trajectory of the bullet when the bullet first hits and/or exits each light plane, as well as at least one time measurement on said at least one passage through the at least one light plane. Using the at least three time measurements of the passage of the bullet through said at least three light planes, the calculated velocity of the bullet, and the known parameters of the locations of the light planes and target plane, such as distances and angle(s), the at least one processor is further configured for calculating, in each 2D plane, at least one of: the left impact point of the bullet on the shooting disc or target plane, the right impact point of the bullet on the shooting disc or target plane, a centre point of the bullet trajectory crossing a light curtain, and the centre/centre point of the impact point of the bullet on the shooting disc or target plane in each 2D plane, to then calculate the centre impact point of the bullet on the shooting disc or target plane in 3D using at least one of the known and/or calculated parameters.

In an embodiment, the at least one light plane may be located parallel and proximate to the target plane at a set or predetermined second distance between the at least one light plane and the target plane, with the processor being configured for correcting the coordinates of the left impact point of the bullet on the shooting disc or target plane or the right impact point of the bullet on the shooting disc or target plane in each 2D plane with a size of S/2 to then calculate the centre of the bullet on the target plane, S being the predetermined shadow diameter/2D width of the bullet.

In a second embodiment, at least two first light planes may be located parallel to each other to form at least one predetermined first angle with the shooting disc or target plane, and at least two second light planes may be located parallel to each other to form at least one predetermined second angle with the shooting disc or target plane, with the at least one processor being configured for calculating the centre of the bullet on the target plane and optionally the angle(s) of the trajectory of the bullet relative to the target plane, by calculating at least two points in each 2D plane for the passage of the centre of the bullet through the light planes.

In a third embodiment, the at least one light plane may form at least one predetermined second angle with the shooting disc or target plane, with the at least one processor being configured for providing for detection of at least one trigging point of the other side of the projectile or trajectory of the bullet and at least one time measurement on this at least one passage through the at least one light plane, and the at least one processor being configured for calculating the centre of the bullet on the target plane by using the left impact point of the bullet on the shooting disc or target plane and the right impact point of the bullet on the shooting disc or target plane in each 2D plane. The one side impact point is calculated by the at least one processor using a first lateral line for the projectile or trajectory of the bullet through the two trigging points at the two time measurements, whereas the second side impact point is calculated by the at least one processor using a second lateral line for the projectile or trajectory of the bullet which is calculated and/or extrapolated parallel to the first lateral line and which, at the at least one time instant, passes through the at least one trigging point of the other side of the bullet.

The system may further comprise a display means having a screen for displaying, on the screen, at least one of: the centre impact point of the bullet on the shooting disc or target plane, an error message relating to parallax error, an error message relating to shooting on wrong target (crossfire), the velocity of the bullet when passing through the target disc arrangement, information on the measured bullet width and/or bullet length, indicating any problems with the accuracy of the detection of each individual shot, information on the angle of the measured bullet trajectory, indicating the location of the shooter and/or any problems with the accuracy in the detection of each individual shot, and the position of the shooter at each individual shot relative to the centre line through the centre of the target disc.

The invention also relates to a method for determining an impact point of a bullet on a shooting disc or target plane, comprising the steps of:

arranging at least five light curtains or planes in a particular light plane pattern in three dimensions (3D), which forms at least three light curtains or light planes in two dimensions (2D), wherein the two-dimensional light curtains or planes are arranged or provided in such a manner that in one of two unknown coordinates of the centre of the impact point of the bullet on the shooting disc or target plane, at least two light planes will form at least one set or predetermined first angle with the shooting disc or target plane and be arranged at a predetermined first distance from each other, detecting, by at least one processor, at least two trigging points of a side of the projectile or trajectory of the bullet when the bullet first hits and/or exits each light plane and at least two time measurements on such passages through said at least two light planes, calculating, by the at least one processor, the velocity of the bullet using the two of the time measurements of the passage of the bullet through the two light planes that are parallel to each other and located at the predetermined first distance from each other, and arranging at least one light plane at one of two unknown coordinates of the centre of the impact point of the bullet on the shooting disc or target plane, so as to not be parallel to said at least two light planes, to thereby detect, by the at least one processor, at least one trigging point of the projectile or trajectory of the bullet when the bullet first hits and/or exits each light plane, as well as at least one time measurement on this at least one passage through the at least one light plane, and calculating, in each 2D plane, at least one of: the left impact point of the bullet on the shooting disc or target plane and the right impact point of the bullet on the shooting disc or target plane, a centre point of the bullets' trajectory crossing a light curtain, and the centre/centre point for the impact point of the bullet on the shooting disc or target plane in each 2D plane, by the at least one processor and using the at least three time measurements of the passage of the bullet through said at least three light planes, the calculated velocity of the bullet, and the known parameters of the positions of the light planes and the target plane, such as distances and angle(s), to then calculate the centre of the impact point of the bullet on the shooting disc or target plane in 3D using at least one of the known and/or calculated parameters.

In an embodiment, the at least one light plane may be located parallel and proximate to the target plane with a set or predetermined second distance between the at least one light plane and the target plane, with the method further comprising the step of correcting the coordinates of the left impact point of the bullet on the shooting disc or target plane or the right impact point of the bullet on the shooting disc or target plane in each 2D plane with a size of S/2 to then calculate the centre of the bullet on the target plane, S being the predetermined shadow diameter/2D width of the bullet.

In a second embodiment, at least two first light planes may be located parallel to each other to form at least one predetermined first angle with the shooting disc or target plane, and at least two second light planes may be located parallel to each other to form at least one predetermined second angle with the shooting disc or target plane, with the method further comprising the step of calculating the centre of the bullet on the target plane and optionally the angle(s) of the trajectory of the bullet relative to the target plane, by calculating at least two points, in each 2D plane, for the passage of the centre of the bullet through the light planes.

In a third embodiment, the at least one light plane may form at least one predetermined second angle with the shooting disc or target plane, with the step of detecting at least one trigging point of the other side of the projectile or trajectory of the bullet as well as at least one time measurement on such at least one passage through the at least one light plane being configured for calculating the centre of the bullet on the target plane using the left impact point of the bullet on the shooting disc or target plane and the right impact point of the bullet on the shooting disc or target plane, in each 2D plane, with the one side impact point being calculated using a first lateral line for the projectile or trajectory of the bullet through the two trigging points at the times of the two time measurements and the other side impact point being calculated using a second lateral line for the projectile or trajectory of the bullet which is calculated and/or extrapolated parallel to the first lateral line and which at the at least one time instant passes through the at least one trigging point of the other side of the bullet.

The method may further include the following steps:
correcting for parallax error, and/or
calculating the position of the shooter relative to the centre line through the centre of the shooting disc.

The method may further include the step of displaying at least one of: the centre impact point of the bullet on the shooting disc or target plane, an error message relating to parallax error, an error message relating to shooting on wrong target (cross-fire), the velocity of the bullet when passing through the target disc arrangement, information on the measured bullet width and/or bullet length, indicating any problems with the accuracy of the detection of each individual shot, information on the measured angle of the bullet trajectory, indicating the location of the shooter and/or any problems with the accuracy in the detection of each individual shot, and the position of the shooter at each individual shot relative to the centre line through the centre of the shooting disc.

BRIEF DESCRIPTION OF THE DRAWINGS

These and other aspects of the invention are apparent from and will be further elucidated, by way of example(s), with reference to the drawings, wherein:

FIGS. 5A-5B illustrate how the light disperses through an aperture wherein diodes are used in order to provide the light curtains in the light planes.

Five embodiments of the invention (i. FIGS. 1A-1B; ii. FIGS. 1C-1D; iii. FIG. 1E; iv. FIGS. 2A-2B; and v. FIGS. 2C-2D), each having its own pattern of light planes, are described below with reference to FIGS. 1A-1E, 2A-2D. Then three additional variants are presented having different light planes, shown in FIGS. 3A-3C. Following a description of possible constructions of the target disc/target disc arrangement (FIGS. 4A-4B) and the operation of the light planes (FIGS. 5A-5B and 6A-6C), a bullet detection method handling more general cases by correcting parallax error (FIG. 7) and capable of calculating the position of the shooter is disclosed.

FIGS. 1A and 1B depict an embodiment including a total of eight (2+3×2) light planes located in a 3D coordinate system (x, y, z). Two light planes, $L_{KV1}$ and $L_{KV2}$, appears in both drawings and can be used for determining the bullet velocity v, whereas the remaining planes can be used for determining the impact point $P_S$ of bullet K in target plane $B_P$ at the back of the target disc/target disc arrangement. It is assumed in the present example that the bullet trajectory $K_B$ is perpendicular to target plane $B_P$.

Figure 1A:
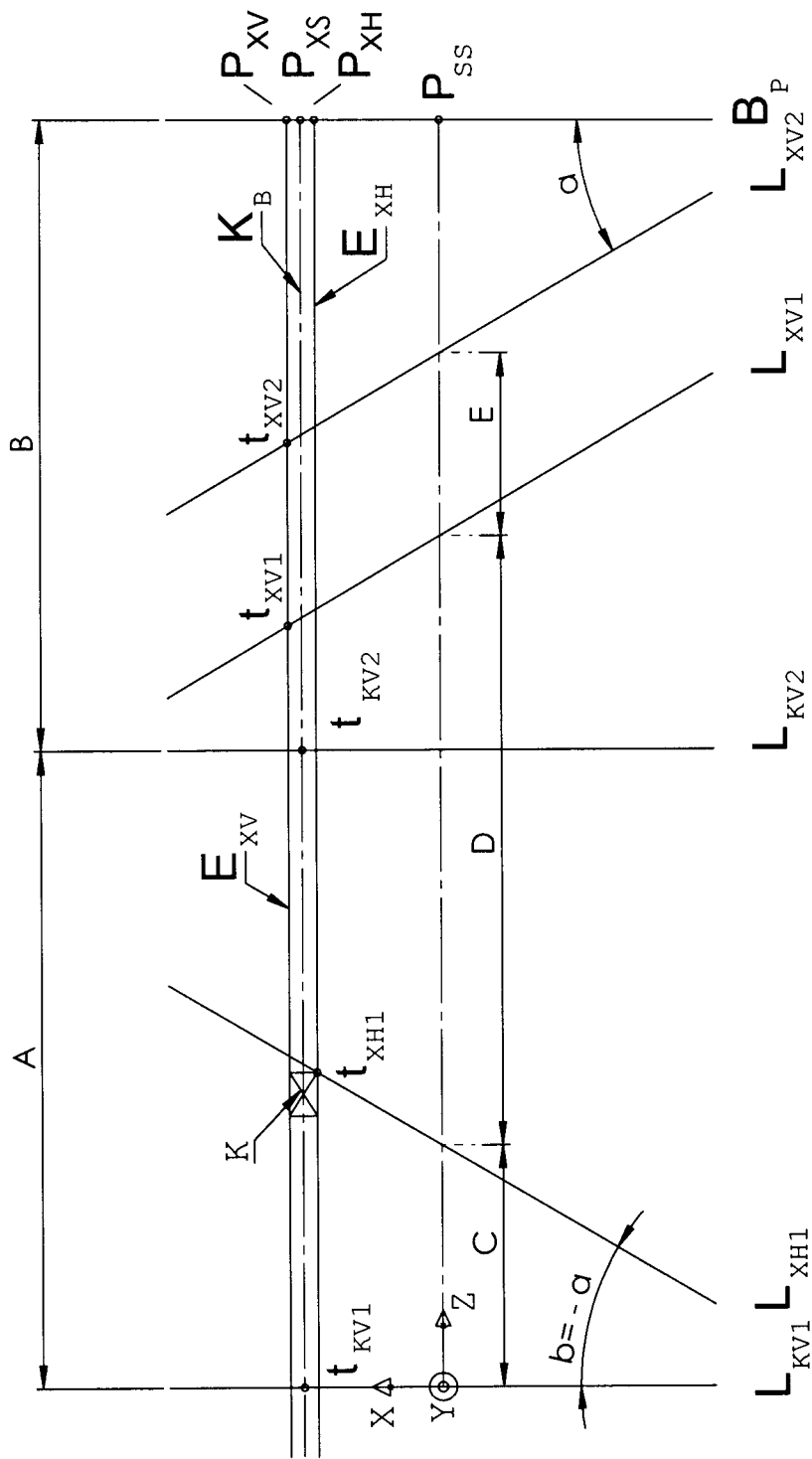
FIGS. 1A-1B illustrate a first embodiment of the invention including a total of eight light planes located in XZ and YZ planes of a three-dimensional coordinate system.

The light planes shown in FIGS. 1A/1B are used for determining the x-/y-coordinate, respectively, of the bullet impact point $P_S$. The further description of the embodiment is only based on FIG. 1A and the determination of the x-coordinate of the impact point $P_{XS}$ of bullet K, as the method for determining the y-coordinate of the impact point $P_{YS}$ of the bullet K will be equivalent. The same, regarding the x- and y-coordinates, applies for the embodiments discussed below with reference to the remaining drawings.

The two light planes $L_{KV1}$ and $L_{KV2}$ are parallel to target plane $B_P$ and have a set or predetermined mutual distance (A), so, by measuring the times $t_{KV1}$ and $t_{KV2}$ for the passage of bullet K through the respective planes, the bullet velocity v can be calculated. Even though, in some cases, it may be necessary to take the retardation of the bullet into account, the present description will assume that the bullet velocity v is constant across the entire target disc/target disc arrangement. In the following, all time differences between measurement points may be considered as distances.

Two of the three remaining light planes, $L_{XV1}$ and $L_{XV2}$, are parallel and form a given angle a with (light) planes $L_{KV1}$, $L_{KV2}$, and $B_P$. The position and mutual distance (E) between (light) planes $L_{XV1}$, $L_{XV2}$ is determined. The orientation of the planes makes the one bullet edge (e.g. the left one, as shown in FIG. 1A) cross the light planes before the rest of the bullet K. The measured times at which the left bullet edge penetrates $L_{XV1}$ and $L_{XV2}$ are denoted $t_{XV1}$ and $t_{XV2}$, respectively.

Similarly, light plane $L_{XH1}$ forms an angle b with planes $L_{KV1}$, $L_{KV2}$ and $B_P$, at a known distance (C) behind the first light plane $L_{KV1}$. Angle b orients light plane $L_{XH1}$ so that the other side of the bullet K (e.g. the right one, as in FIG. 1A) penetrates the plane first, and the measured time is denoted $t_{XH1}$. Angle b may be, but is not limited to, b=-a.

The difference in time between either $t_{KV1}$ or $t_{KV2}$ and the time measurements $t_{XV1}$ and $t_{XV2}$ of the one bullet edge forms the basis for the calculation of the z-coordinates of the measuring points, and from the z-coordinates, the x-coordinates may be determined. One has then determined two points in the plane (2D) through which the bullet edge has travelled, and a first lateral line $E_{XV}$ of the bullet trajectory $K_B$ is determined and extrapolated to target plane $B_P$. It is essential to know the position and orientation of all light planes relative to each other and the target plane to be able to carry out these calculations. The second lateral line $E_{XH}$ of the bullet trajectory $K_B$ is formed by drawing a line which is parallel to $E_{XV}$ and passes through the calculated point at which the bullet was located when time measurement $t_{XH2}$ was made.

At the intersections of lateral lines $E_{XV}$ and $E_{XH}$ of bullet trajectory $K_B$ with target plane $B_P$ there are two impact points, $P_{XV}$ and $P_{XH}$, having x-coordinates $x_V$ and $x_H$ relative to the centre, $P_{SS}$ of the shooting disc. The x-coordinate of the impact point $P_{XS}$ of the centre of the bullet will be situated midway between these two points $P_{XV}$, $P_{XH}/X_V$, $X_H$; $X=X_H+(X_V-X_H)/2=(X_H+X_V)/2$.

To calculate the impact point $P_S$ of bullet K in three coordinates (the z-coordinate, the position of the target plane, being known), in the above embodiment, it will be necessary to measure a total of eight time instants at which bullet K passes through each plane.

In an alternative embodiment (FIGS. 1C-1D), the two light planes $L_{XV1}$ and $L_{XV2}$, which are parallel to each other and have a set or predetermined mutual distance (E), may be used for calculating the bullet velocity v by using the difference between the times $t_{XV1}$ and $t_{XV2}$ for the passage of (the left side of) bullet K through the respective planes and then use the known distance (E) between these planes $L_{XV1}$, $L_{XV2}$ to perform the above calculation. Thus, the two light planes $L_{KV1}$ and $L_{KV2}$, which are parallel to target plane $B_P$, will be redundant in this embodiment. To calculate the impact point $P_S$ of bullet K in three coordinates (the z-coordinate, the position of the target plane $B_P$, being known), in the above embodiment, it will be necessary to measure a total of six time instants in the 3D coordinate system by means of six light planes (i.e. three time instants in a 2D plane for X (FIG. 1C), respective Y (FIG. 1D), using three light planes) for the passage of bullet K through each plane. It is assumed in this case that the bullet trajectory $K_B$ is perpendicular to target plane $B_P$ so that impact points $P_{XH1}$ and $P_{YH1}$, as calculated in planes $L_{XH1}$ and $L_{YH1}$, respectively, can be extrapolated to target plane $B_P$.

It is worth noting here that the calculation can be carried out in alternative manners, and also that the different light planes can be moved to different positions along the bullet trajectory.

Figure 1B:
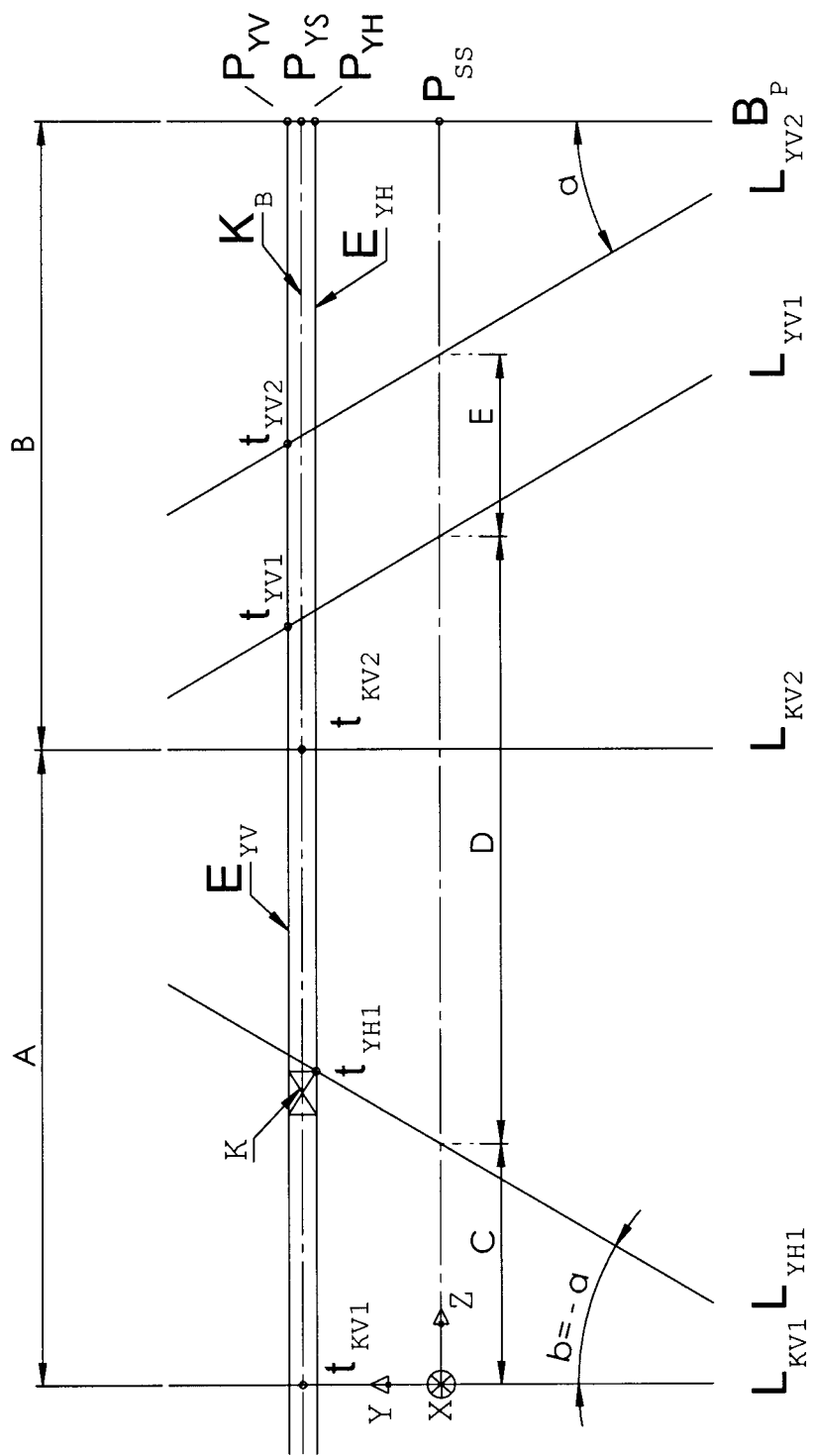
Figure 1C:
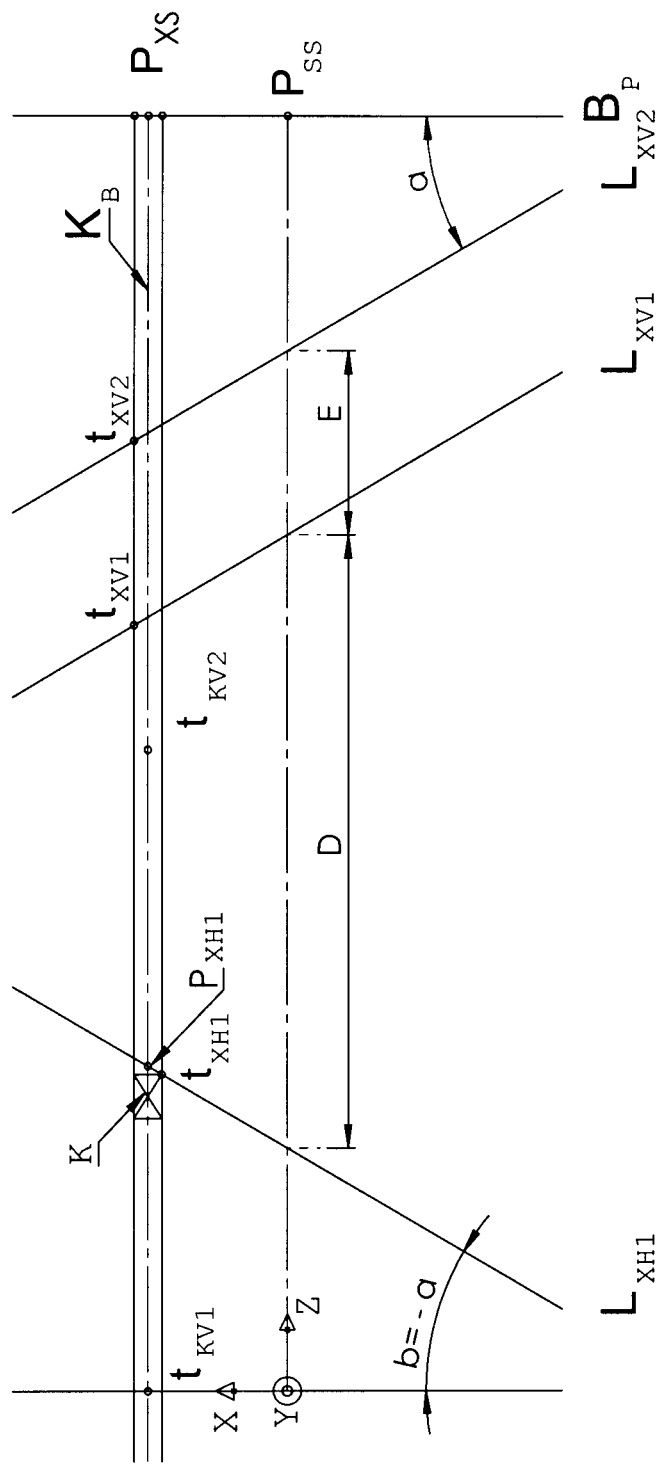
FIGS. 1C-1D illustrate, in the XZ and YZ planes, a second embodiment of the invention having alternative and/or additional calculations with respect to the first embodiment.
Figure 1D:
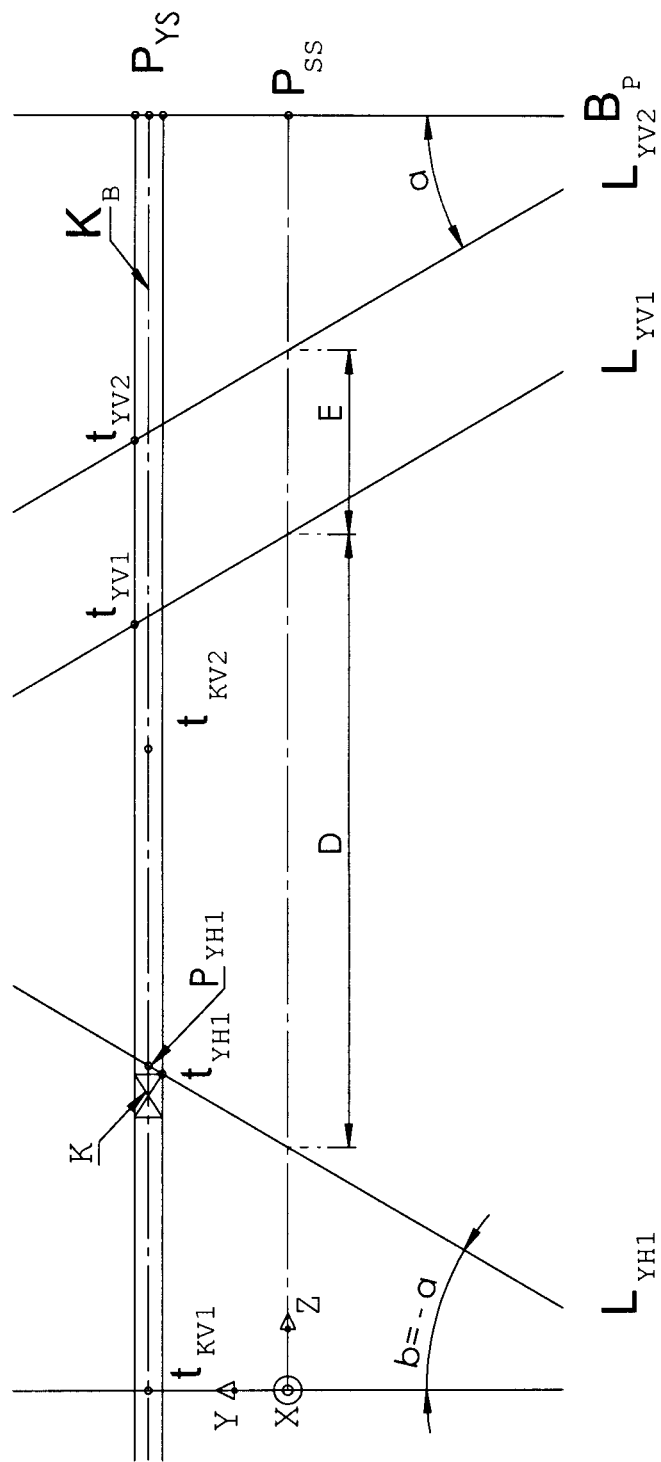

In the embodiment of FIGS. 1A-1B, one may, additionally and/or alternatively, calculate the bullet velocity v from the time difference between the passages of planes $L_{XV1}$ and $L_{XV2}$. This allows the calculation of the x- (respective y-) coordinates in planes $L_{XH1}$, $L_{KV1}$, and $L_{KV2}$ or in any other possible light plane combination for x (respective y). The positioning of planes and the choice of method will influence the sensitivity to measuring errors. Additionally, it will be possible to calculate impact points on individual planes with no parallax error, so that, in some applications, the embodiment can be simplified while still achieving sufficient accuracy.

Figure 1E:
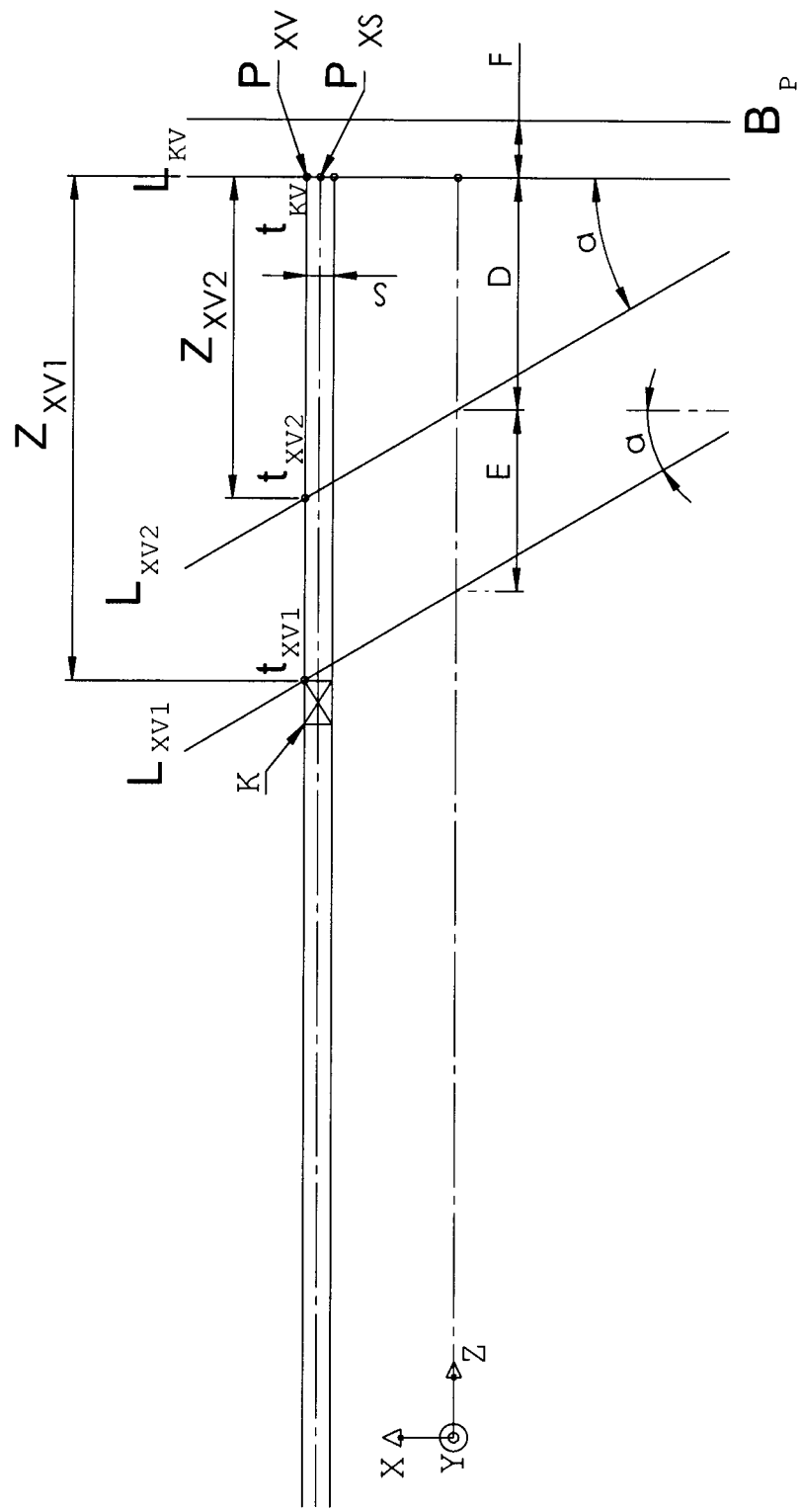
FIG. 1E shows a third embodiment of the invention including a total of five light planes located in the XZ plane of the three-dimensional coordinate system.

The simplest embodiment in this regard is shown in FIG. 1E, in which, using a total of 5 light planes, hits can be calculated with no parallax error in the plane $L_{KV}$. If target plane $B_P$ is located parallel and proximate to plane $L_{KV}$, an embodiment is achieved that may be sufficiently accurate for some applications (although shooting may occur crosswise). $L_{KV}$ is common for both the x- and y-axes. The mutually parallel planes $L_{XV1}$ and $L_{XV2}$ are located at an angle a relative to planes $L_{KV}$, respective $B_P$, and are used for determining the x-coordinate of the impact point of bullet K in plane $L_{KV}/B_P$. To achieve a certain level of accuracy it is important that target plane $B_P$ is located parallel to plane $L_{KV}$ and that the distance F between plane $L_{KV}$ and target plane $B_P$ is small. Using the distance (E) between planes $L_{XV1}$ and $L_{XV2}$ and using the difference between time instants $t_{XV1}$ and $t_{XV2}$ at which bullet K passes through the respective planes, the bullet velocity v perpendicular to plane $L_{KV}$ can be calculated. Hence, by measuring the time instant $t_{KV}$ at which bullet K passes through plane $L_{KV}$, the distance $Z_{XV2}$ between planes $L_{XV2}$ and $L_{KV}$ or, alternatively, the distance $Z_{XV1}$ between planes $L_{XV1}$ and $L_{KV}$ can be determined. The distances $Z_{XV2}$ and/or $Z_{XV1}$ are measured perpendicularly to plane $L_{KV}$. Since the distance and angle of plane $L_{KV}$ relative to plane $L_{XV2}$ and/or $L_{XV1}$ are known, this information can be used for determining the x-coordinate $P_{XV}$ of the point of passage of the bullet K through the plane $L_{KV}$.

It should also be noted that after the left or right impact point, $P_{XV}$, $P_{XH}$, respectively, of bullet K on target plane $B_P$ has been determined, the predetermined shadow diameter S of the bullet K (i.e. the shadow width of the bullet in a 2D plane) could be used for correcting the x-, respective y-, coordinates with a size of S/2 to determine the x-, respective y-, coordinate of the points of impact $P_{XS}$, $P_{YS}$, respectively, of the centre of the bullet $P_S$ on the target plane $B_P$. It should be noted here that S is a predetermined quantity that can be derived empirically for a particular type of projectile for a particular implementation.

Alternative implementations are envisioned in that light plane $L_{KV}$ is located at different locations relative to the tilted planes. As a possible example we can mention the embodiment in which target plane $B_S$ and then light plane $L_{KV}$ are located in front of the remaining light planes.

Figure 2A:
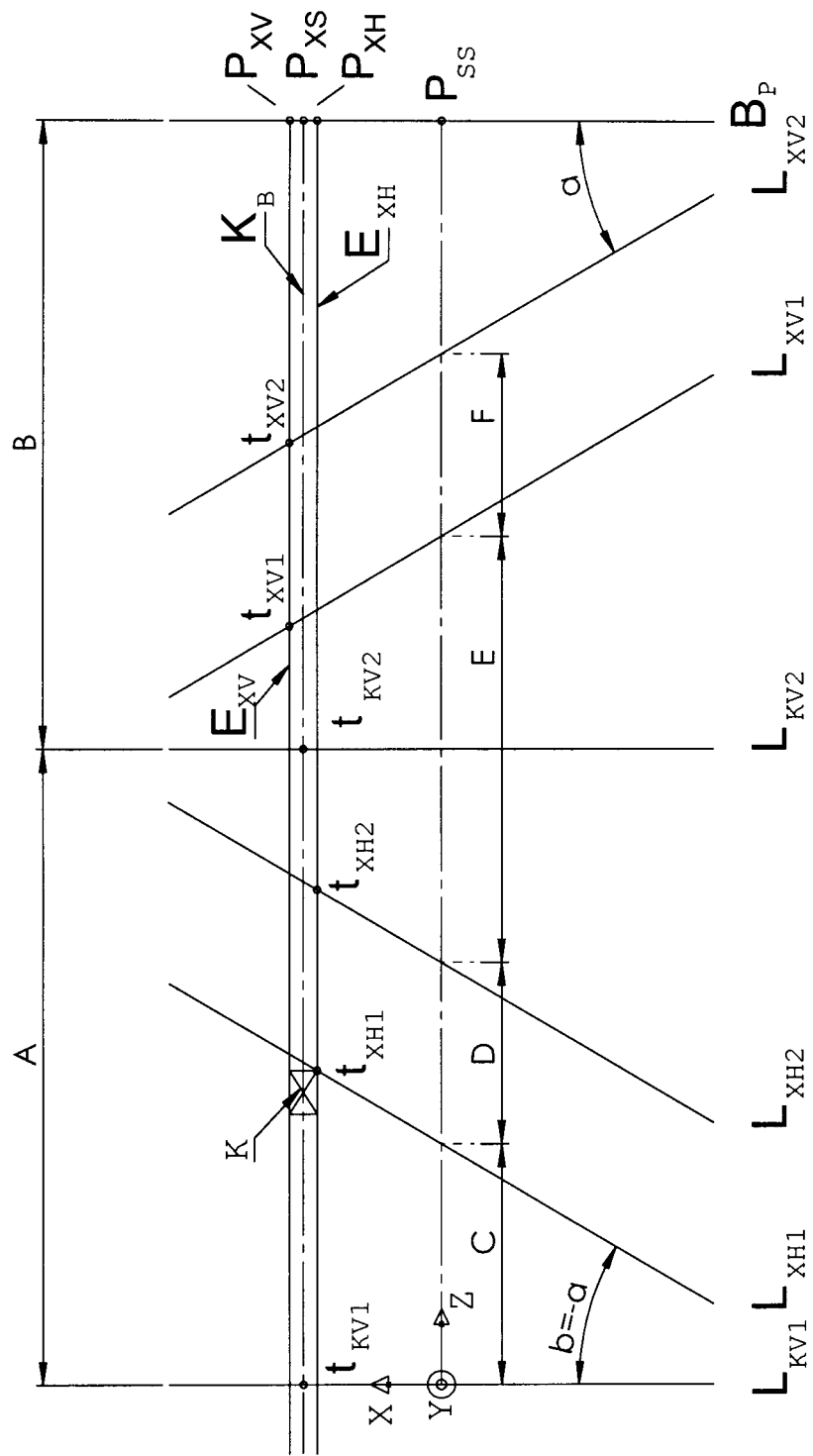
FIGS. 2A-2B illustrate, in the XZ and YZ planes, a fourth embodiment of the invention having a different light plane pattern.
Figure 2B:
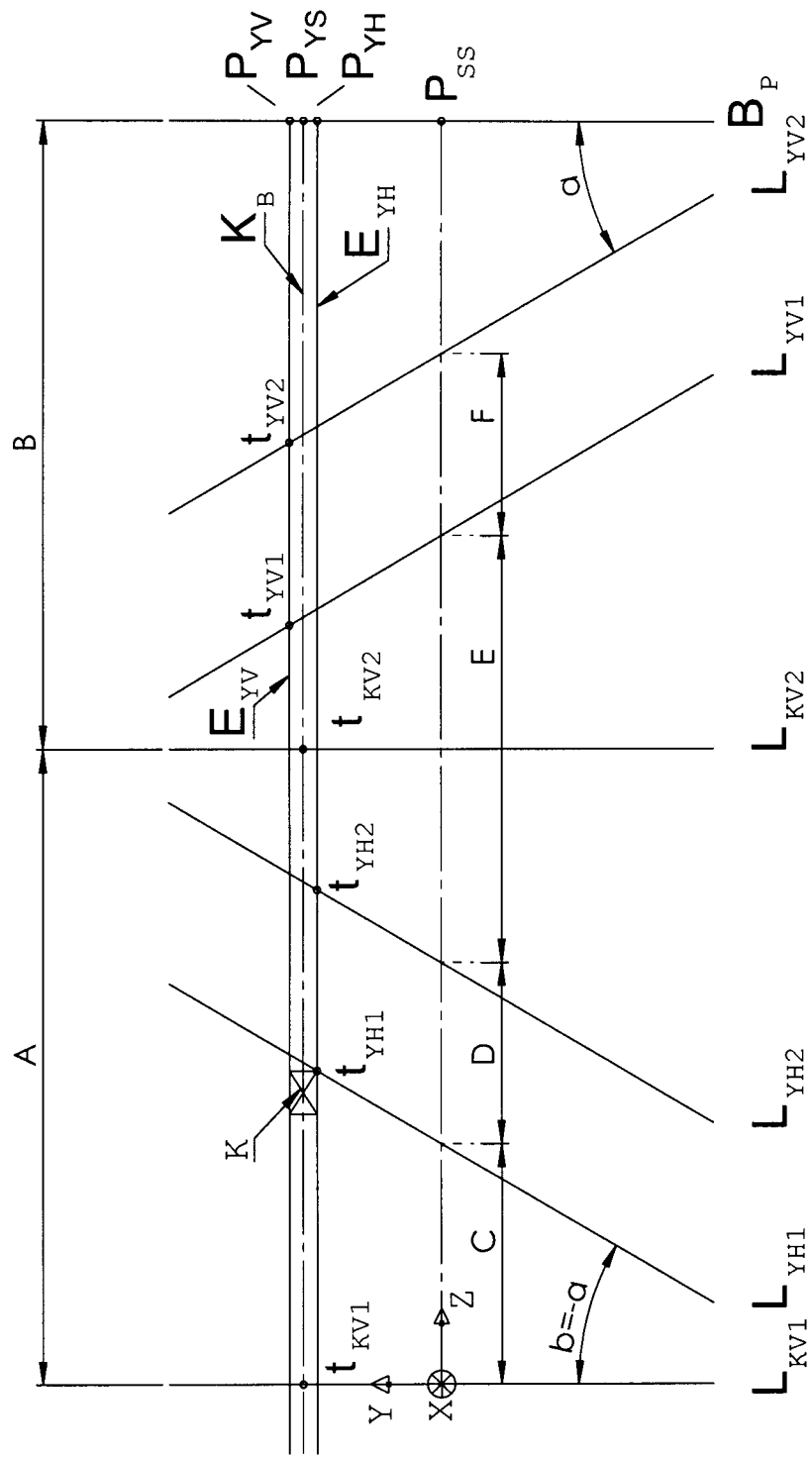

FIGS. 2A and 2B depict an embodiment including a total of ten (2+4×2) light planes located in a 3D coordinate system (x,y,z). This embodiment differs from the one described above (see e.g. FIGS. 1A-1B) in that the lateral lines for the bullet trajectory are determined independently of each other. Two light planes, $L_{KV1}$ and $L_{KV2}$, appears in both drawings and are used for determining the bullet velocity v, while the remaining planes are used for determining the impact point $P_S$ of bullet K on target plane $B_P$ at the back of the target disc or target disc arrangement. It is assumed here first that the bullet trajectory $K_B$ is perpendicular to target plane $B_P$.

The light planes shown in FIGS. 2A/2B are used for determining the x-/y-coordinate, respectively, of the impact point of the bullet. The further description of the embodiment is only based on FIG. 2A and the determination of the x-coordinate of the impact point of bullet K, as the method for determining the y-coordinate is equivalent.

The two light planes $L_{KV1}$ and $L_{KV2}$ are parallel to target plane $B_P$ and have a set or predetermined mutual distance (A), so, by measuring the time-points $t_{KV1}$ and $t_{KV2}$ for the passage of bullet K through the respective planes, the bullet velocity v may be calculated. Again, in this discussion, we assume that the bullet velocity v is constant across the entire target disc/target disc arrangement (i.e. throughout the depth of the target disc/target disc arrangement). In the following, all time differences between measurement points may be considered as distances.

Two of the remaining four light planes, $L_{XV1}$ and $L_{XV2}$, are parallel and form a given angle a with planes $L_{KV1}$, $L_{KV2}$, and $B_P$. The locations and mutual distance (F) of the planes is set or determined. The orientation of the planes causes the one bullet edge (e.g. the left one, as shown in FIG. 2A) to penetrate the light planes before the rest of the bullet K. The measured time instants at which the left bullet edge penetrates $L_{XV1}$ and $L_{XV2}$ are denoted $t_{XV1}$ and $t_{XV2}$, respectively.

Similarly, the last two light planes, $L_{XH1}$ and $L_{XH2}$, are parallel and form a given angle b with planes $L_{KV1}$, $L_{KV2}$ and $B_P$. The positions and mutual distance (D) of the planes is set or determined. Angle b orients light planes $L_{XH1}$, $L_{XH2}$ so that the other side of bullet K (e.g. the right one, as in FIG. 2A) penetrates the planes first, and the measured times at which penetration occurs are denoted $t_{XH1}$ and $t_{XH2}$, respectively. Angle b may be, but is not limited to, b=-a.

Each pair of time measurements of either bullet edge, $t_{XV1}$ and $t_{XV2}$ or $t_{XH1}$ and $t_{XH2}$, forms the basis for the calculation of the z-coordinates of the measuring points, and from the z-coordinates the x-coordinates can be determined. One has then found two pairs of points through which the bullet edges has travelled, and lateral lines $E_{XV}$ and $E_{XH}$ of bullet trajectory $K_B$ can be determined and extrapolated to target plane $B_P$. It is essential to know the positions and orientations of all light planes relative to each other and the target plane to be able to carry out these calculations. At the inter-sections of the lateral lines with target plane $B_P$, there are two impact points, $P_{XV}$, $P_{XH}$, having x-coordinates $X_V$ and $X_H$ relative to the shooting disc centre, $P_{SS}$. The x-coordinate for the point of impact $P_{XS}$ of the centre, $P_S$, of the bullet will be located midway between these two points $P_{XV}$, $P_{XH}$/$X_V$, $X_H$; $X=X_H(X_V-X_H)/2=(X_H+X_V)/2$. Performing the calculation of the lateral lines for the bullet trajectory independently of each other makes this embodiment of the invention more robust in terms of measuring errors than the one(s) described above.

Also in this embodiment additional and/or alternative calculations can be performed, by calculating the bullet velocity v from the time difference between the passages of planes $L_{XV1}$ and $L_{XV2}$ and/or $L_{XH1}$ and $L_{XH2}$ (see below).

Figure 2C:
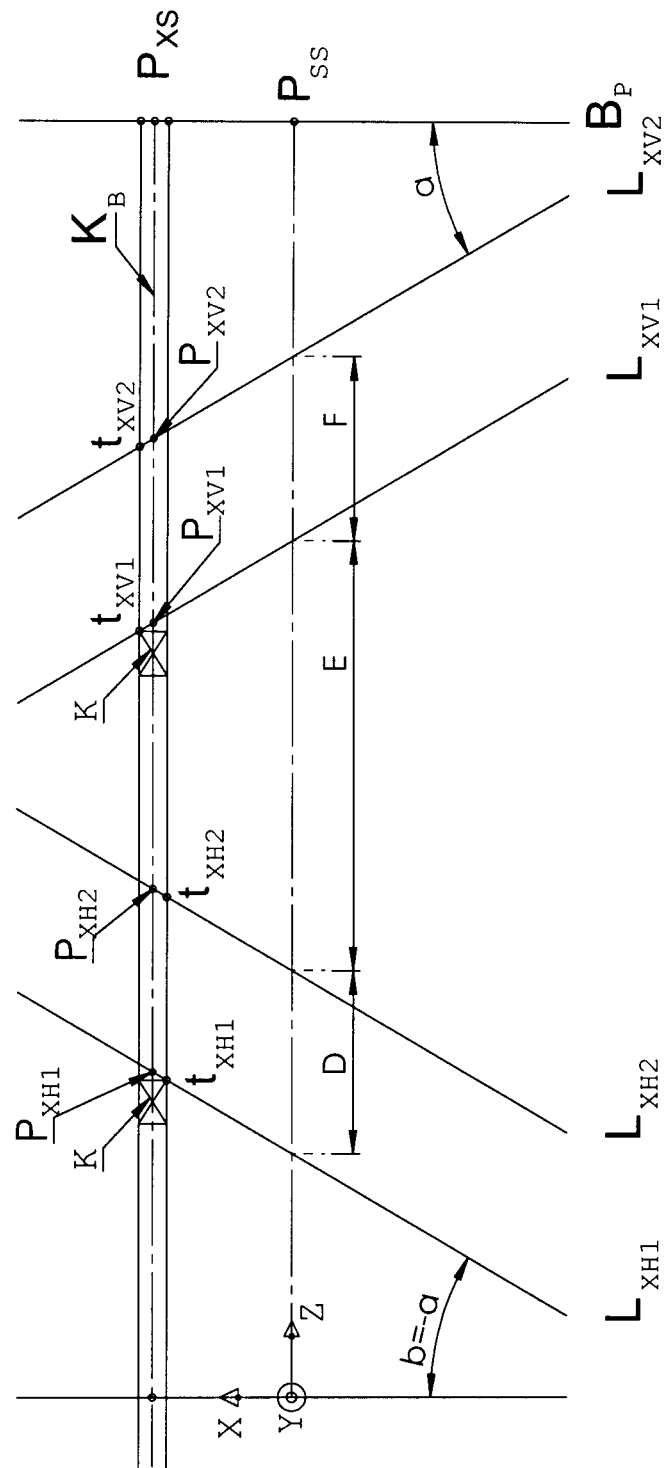
FIGS. 2C-2D show, in the XZ and YZ planes, a fifth embodiment of the invention having alternative and/or additional calculations with respect to the fourth embodiment.
Figure 2D:
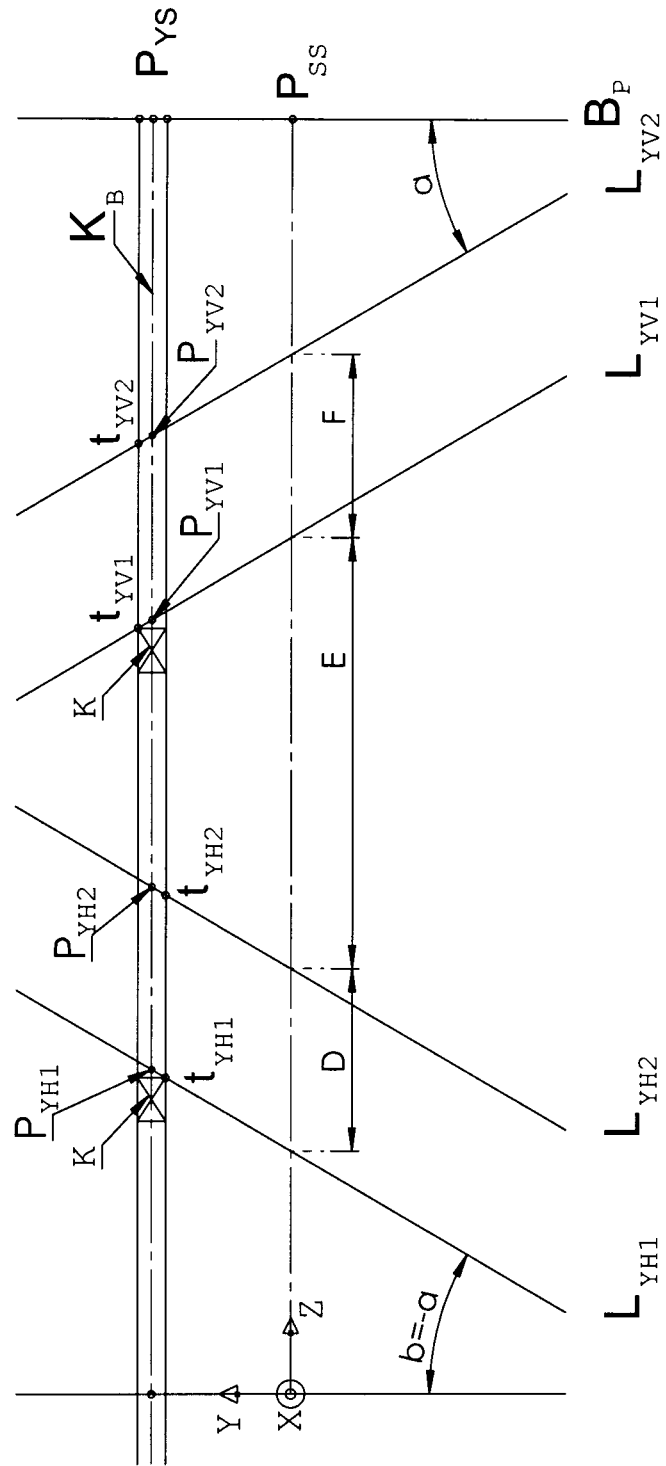

In a further embodiment (FIGS. 2C-2D) at least two planes among: i) the two light planes $L_{XV1}$ and $L_{XV2}$, which are parallel to each other and have a given mutual distance (F) and/or ii) the two light planes $L_{XH1}$ and $L_{XH2}$, which are parallel to each other and have a given mutual distance (D), may be used for calculating the bullet velocity v by measuring the difference between at least two time instants $t_{XV1}$ and $t_{XV2}$ and/or $t_{XH1}$ and $t_{XH2}$ of the passage of the (left side and/or right side of) bullet K through the respective planes and then use at least one of the known distances (F) and/or (D) between these planes $L_{XV1}$, $L_{XV2}$, respective $L_{XH1}$, $L_{XH2}$, to perform the above calculation(s). Thus, said two light planes $L_{KV1}$ and $L_{KV2}$, which are parallel to target plane $B_P$, are redundant in said embodiment. To calculate the impact point $P_S$ of the bullet K in three coordinates (the z-coordinate, the position of the target plane $B_P$, being known), it will then be necessary to measure a total of eight time instants in the 3D coordinate system, by means of eight light planes (i.e. four time instances in a 2D plane for x (FIG. 2C), respective Y (FIG. 2D) by means of four light planes), of the passage of bullet K through each plane. This is the lowest number of measurements that can be performed in this embodiment while still detecting the bullet with a certain accuracy.

It is important to note that if angle b is equal to -a, in this embodiment, it will be possible to calculate points located along the centre of the bullet trajectory $K_B$ of bullet K (and not at the edges of bullet K). In addition, the calculated points will be independent of the angle of the bullet trajectory (no parallax error).

Of course, in the second embodiment, described in the above section, there may be more than two parallel light planes at an angle a/b to target plane $B_P$, but the method will not change except from that there will be more time measurements and thereby more calculated penetration points from which to determine the centre and/or lateral lines for the bullet trajectory.

Figure 3A:
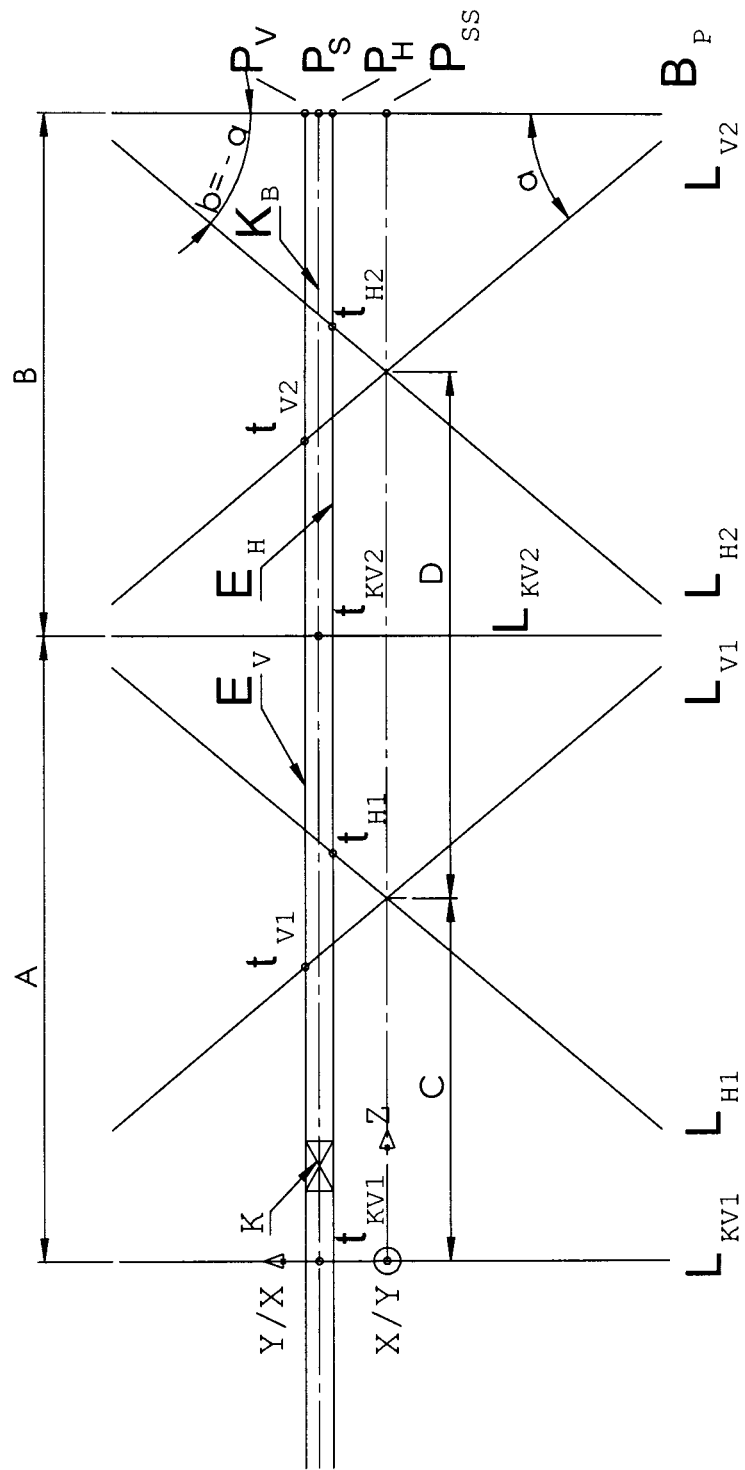
FIGS. 3A-3C show three additional embodiments of the invention with different patterns of the light planes.
Figure 3B:
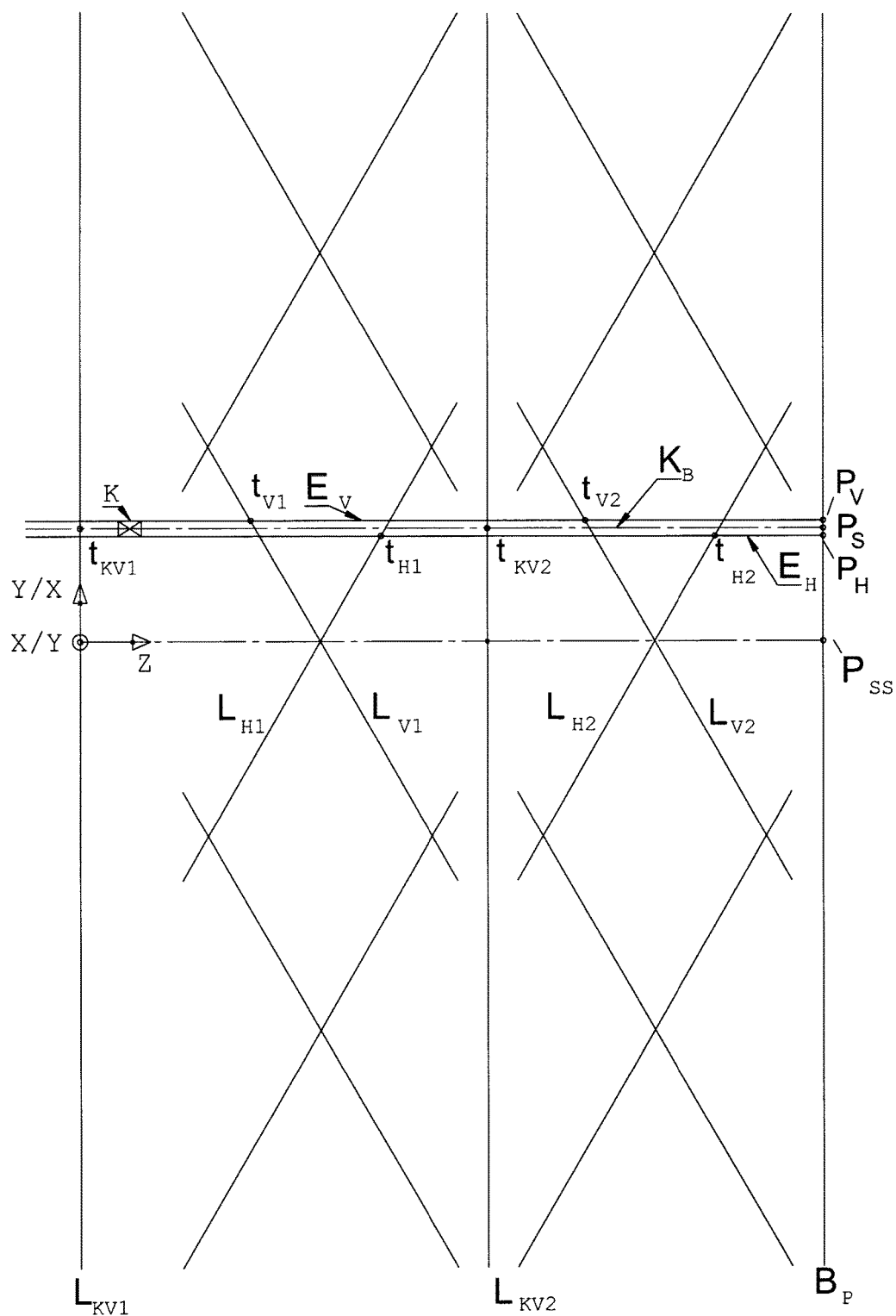
Figure 3C:
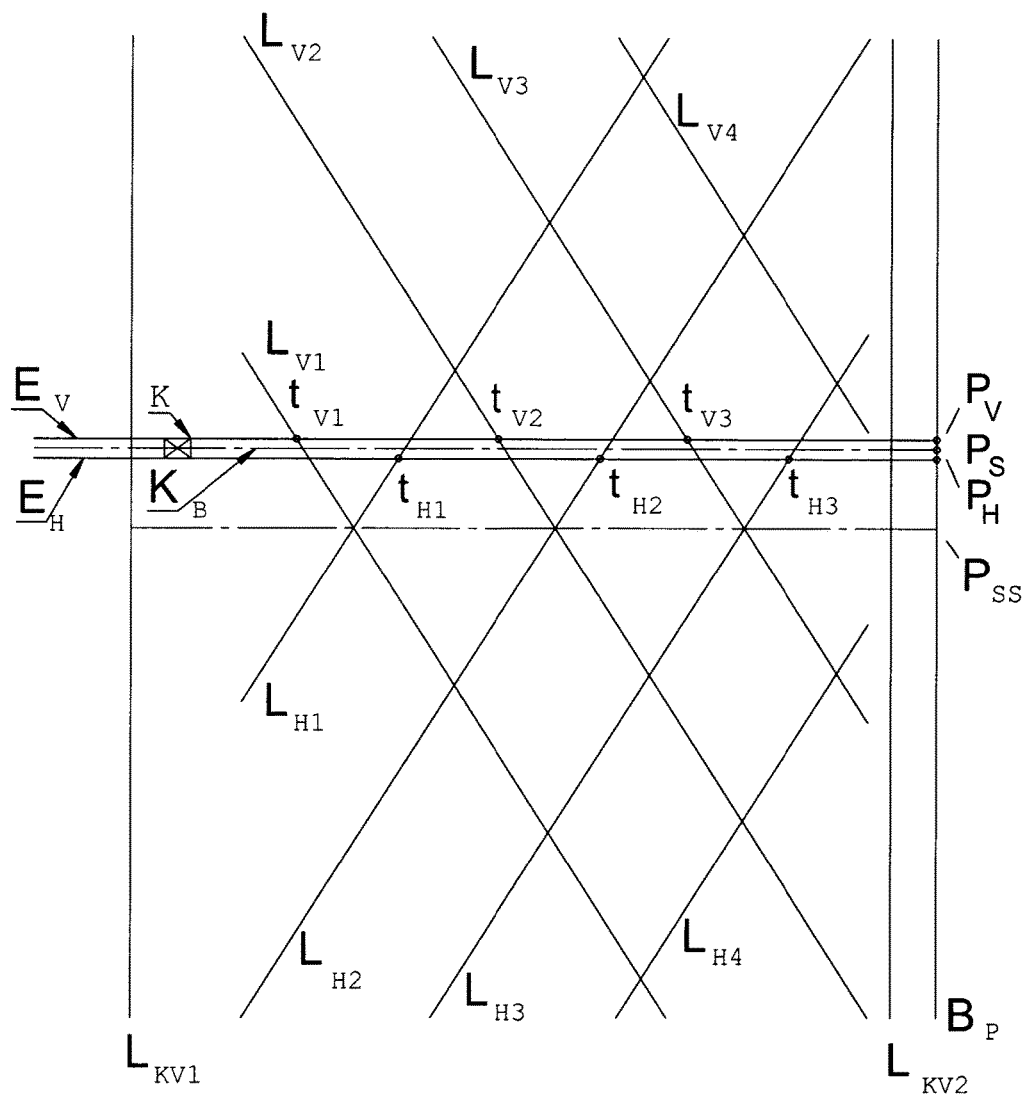

Three other embodiments with different patterns of light planes are shown in FIGS. 3A, 3B, and 3C. The patterns are shaped as two X's in sequence (FIG. 3A), two rows of overlapping X's in sequence (FIG. 3B), and connected, different sized X's forming panes (FIG. 3C). These patterns are formed by allowing the light planes of angle a intersect the light planes of angle b. The purpose of so doing is to detect the bullet closer to target plane $B_P$, reducing the consequences of a measuring error, and to reduce the depth of the shooting disc (the distance from the first light plane $L_{KV1}$ to target plane $B_P$). The idea behind allowing the planes to overlap each other to a smaller or greater extent (FIGS. 3B and 3C) is to avoid inaccuracies that may arise if the bullet passes through the light planes too close to one of the ends. Alternative embodiments may include patterns different from those presented in FIGS. 2A-2D and 3A-3C, as long as they are constructed in accordance with the main principles discussed above.

Figure 4A:
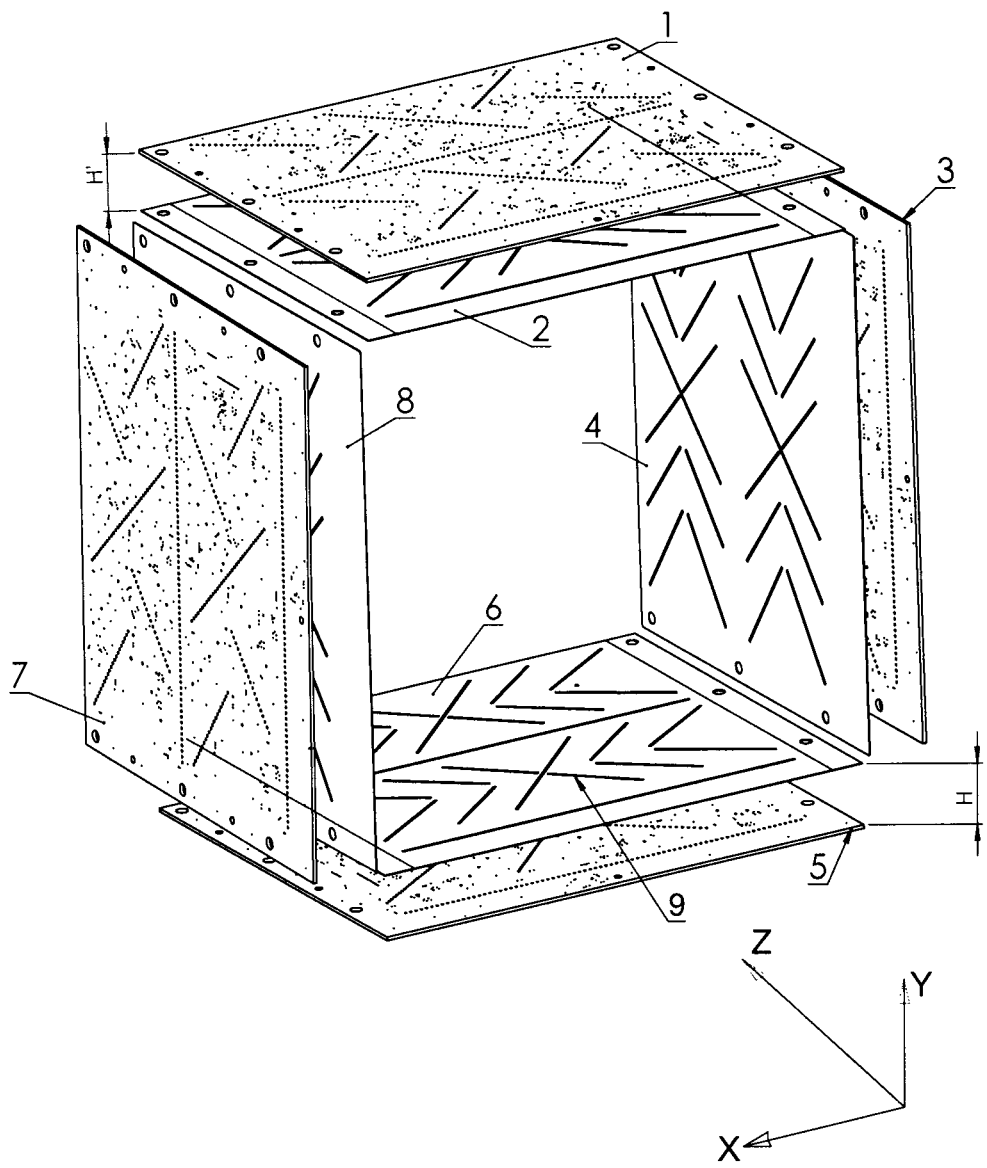
FIGS. 4A-4B illustrate metal sheets with apertures for creating light curtains and respective support plates (the latter shown only in FIG. 4A).

In the light planes, a light curtain and sensors suitable to detect shadows therein must be provided. A light curtain can be defined as substantially uniform, overlapping light emitted from many light sources. A light curtain is formed by a slot or aperture 9 in a metal or filter sheet 2, 4, 6, 8 (FIG. 4A). The light radiates perpendicularly onto filter sheet 6, originating from light sources on a support plate 5 provided proximate to or directly underneath the slot/aperture opening(s) 9 at an appropriate distance H from filter sheet 6. The distance H between the light sources is chosen so that the diagram of radiation of the light sources overlaps each other and covers the entire shooting disc or target area with no dead zones. Filter sheet(s) 2, 4, 6, 8 and/or support plate(s) 1, 3, 5, 7 for the light sources (which may be one or more PCB (Printed Circuit Board) sheet(s)) may include guiding holes and/or reference points and/or other means for the accurate positioning thereof. In a similar manner, on the opposite side of the hole/cavity (FIG. 4A) of the shooting disc, a filter sheet 2 is provided a distance H' below the light sensors on the respective support plate 1, so that the slot/aperture opening is located directly below the sensors. The distance H between the first filter sheet 6 and the light sources on support plate 5 and the distance H' between the second filter sheet 2 and the light sensors on support plate 1 may be the same (H=H'), but this is not necessary. It should be noted that the terms "above" and "below" above is used only in reference to FIG. 4A. From this drawing it is obvious and clear that all filter sheets 2, 4, 6, 8 with slots 9 are located closer to the cavity or axial centre line of the shooting disc than all PCB or support plates 1, 3, 5, 7.

To make the shooting disc and/or system more versatile, an embodiment can be devised in which only the light curtain of the front light plane(s) through which the bullet is to travel, is(are) continuously powered on. Once the bullet is detected, the remaining light curtains must be powered on immediately. When the bullet has passed through, these curtains can again be powered off. In this manner, the power consumption can be significantly reduced. This may allow or make possible the use of a regular or rechargeable battery pack or one or more batteries for supplying power to the score indication and detection system. This will also allow or make possible large shooting disc installations using only one or a few power supply cable(s). This/these may be run from shooting disc (target disc arrangement) to shooting disc (target disc arrangement) from a power supply.

To be able to perform the calculations necessary to determine the bullet impact point, one needs at least one CPU and/or computer and/or one or more separate time measurement counters. To achieve the desired accuracy, a clock oscillator with a frequency in the range of 25-50 MHz will be sufficient.

The length, $\Delta z$, travelled by the bullet during a clock period, $\Delta t$, will be directly related to the uncertainty $\Delta x$, $\Delta y$ in the determination of the x- and y-coordinates. With angles $a=-b=45°$, then $\Delta z=\Delta x=\Delta y$. The value of $\Delta z$ will depend on the bullet velocity v. In the case of a 25 MHz clock oscillator and a bullet velocity of v=170 m/sec (with v=160 m/s being typical for air rifles), one may calculate: $\Delta z$(25 MHz, 170 m/sec)=0.0068 mm, which is well within the accuracy required by the ISSF.

Calculations show that oscillator frequency offsets due to aging and temperature variations present no problem, provided that the frequency is stable in the short term. Instead of measuring the bullet velocity v in m/s or mm/ps, the measure mm/clock period can be used. It is then seen that as long as it is sufficiently short, the clock period is irrelevant when it constant throughout a set of measurements.

Figure 4B:
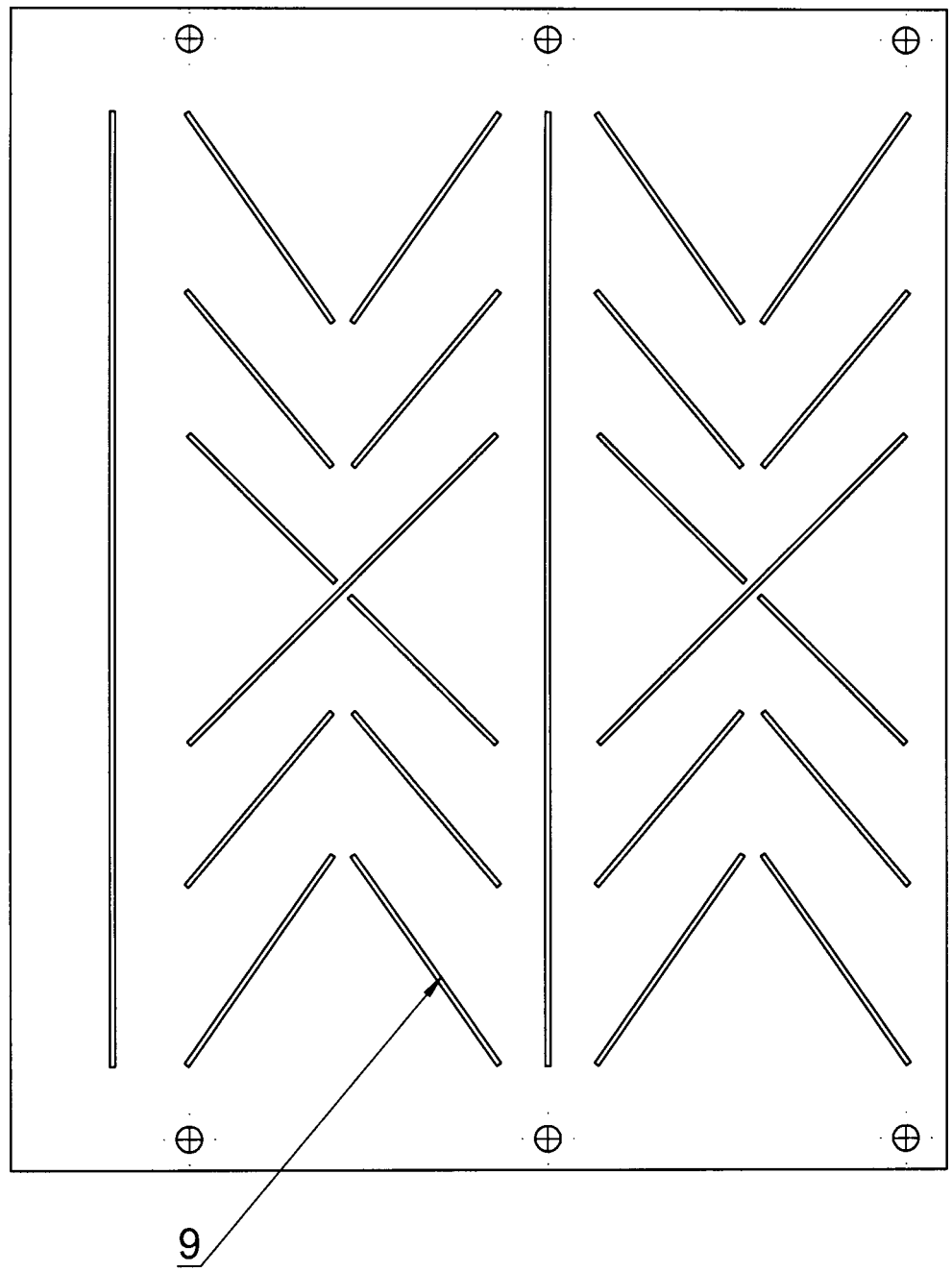

FIG. 4A shows an implementation of a basic three dimensional structure of the shooting disc assembly/apparatus and/or detection system according to the invention with an alternative light plane pattern of X's and V's, as seen more clearly in FIG. 4B. Elements (1), (3), (5), and (7) are PCB sheets for light sources and/or light sensors (IR receiver and/or IR LED, for example), with associated amplifiers (not shown) and/or LED drive electronics (not shown). Elements (2), (4), (6) and (8) are filter sheets. The filter sheets may be metal sheets 2, 4, 6, 8, in which slots or apertures 9 have been laser cut with ultrahigh accuracy in a set or predetermined (light plane) pattern which lets through light (FIG. 4B). Alternatively, filter sheets 2, 4, 6, 8 may be made of glass or plastic having the (light plane) pattern imprinted or etched with high accuracy thereon. Filter sheets 2, 4, 6, 8 may also include guiding holes and/or reference points and/or other means for the accurate positioning of PCB sheets 1, 3, 5, 7 and filter sheets 2, 4, 6, 8 relative to each other. PCB 1, 3, 5, 7 and filter 2, 4, 6, 8 sheets are mounted in parallel with a predetermined distance H and/or H' apart.

On the PCB sheets located above one another, e.g. (1) and (5) in FIG. 4A, there must be provided, in the same light plane, light sources on the one sheet 5 and light sensors on the other 1. Alternatively, to prevent crossing light curtains from interfering with each other, an array of light sources and an array of light sensors crossing each other may be provided on a same sheet. For each light plane pattern, the optimal distribution of light sources and sensors can be determined and/or calculated.

FIG. 5A shows how the light may disperse along an aperture in an embodiment in which diodes are used for providing the light curtains in the light planes. The light diodes can have a certain diagram of radiation, which is ±10° in this case. Hence, the light is not planar and the light from several light diodes will overlap, making the light curtain more or less uniform. In case of small intensity variations, the penetration depth (amount of shadow necessary to detect the bullet) will become dependent on position. The bullet then may be detected slightly too late or early, but the symmetry of the light plane patterns will cancel the resulting error. The calculated lateral lines for the bullet trajectory will then not be 100%/exactly parallel, but the point of impact, midway therebetween, will be correct. It is important that the penetration depth (and any local variations thereof) is equal for all light planes.

FIG. 5B shows the light from the light diodes in the same embodiment as FIG. 5A, across the same aperture. It can be assumed in this case that the light originates from a single point, and is can then be seen that the light curtain is wider near the receiving diode. Presumably, the aperture width of the filter sheet or the lens of the light diode will cause the formation of a region of substantially planar light near the centre of the light diode. The light curtain, therefore, will have a more uniform thickness than shown in this drawing. Regardless, a wedge-shaped light curtain can be corrected for, as the width of the light curtain will be a linear function of the distance from the light diodes. The aperture width and the distance H, respective H', may be chosen so that a desired sensitivity is obtained.

Figure 6A:
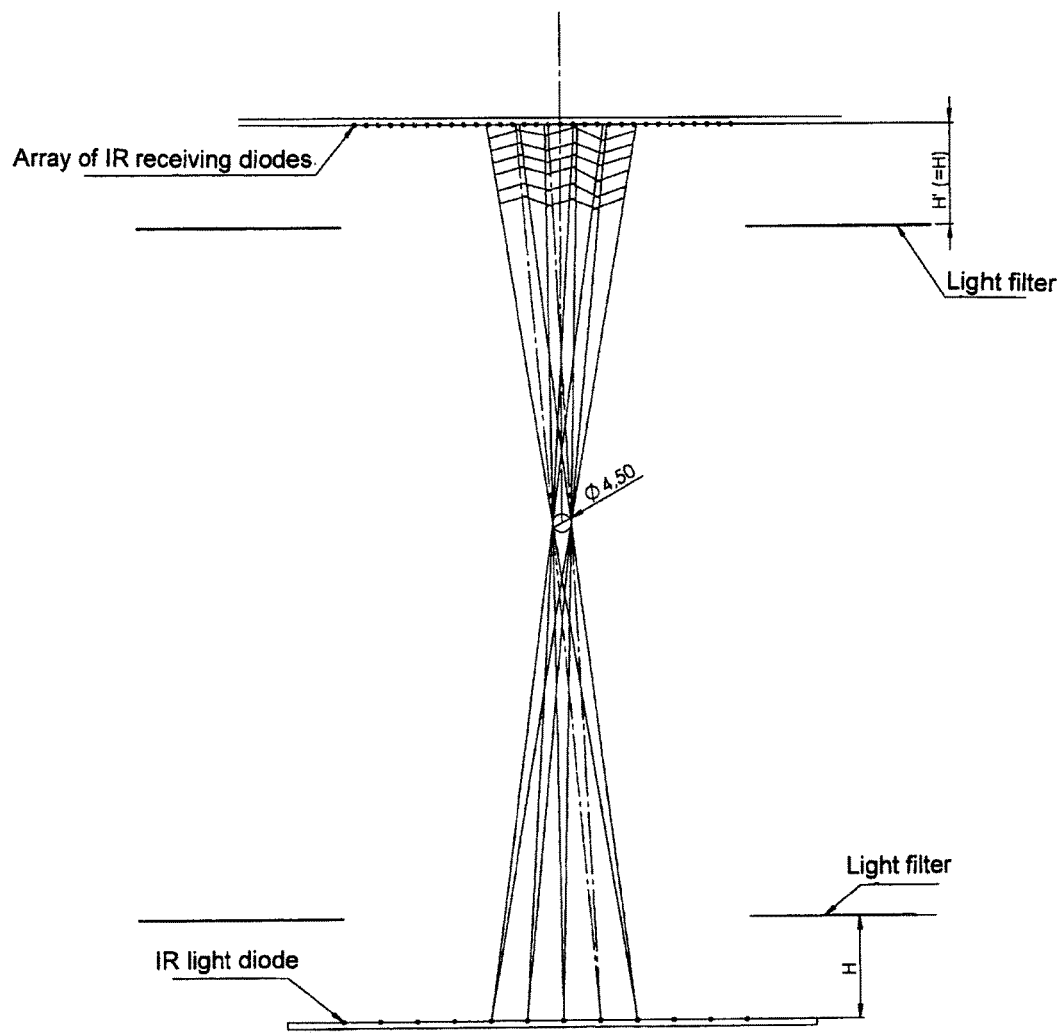
FIGS. 6A-6C show how the extent of a shadow cast by a bullet depends on the position of the bullet as it crosses the light curtain.
Figure 6B:
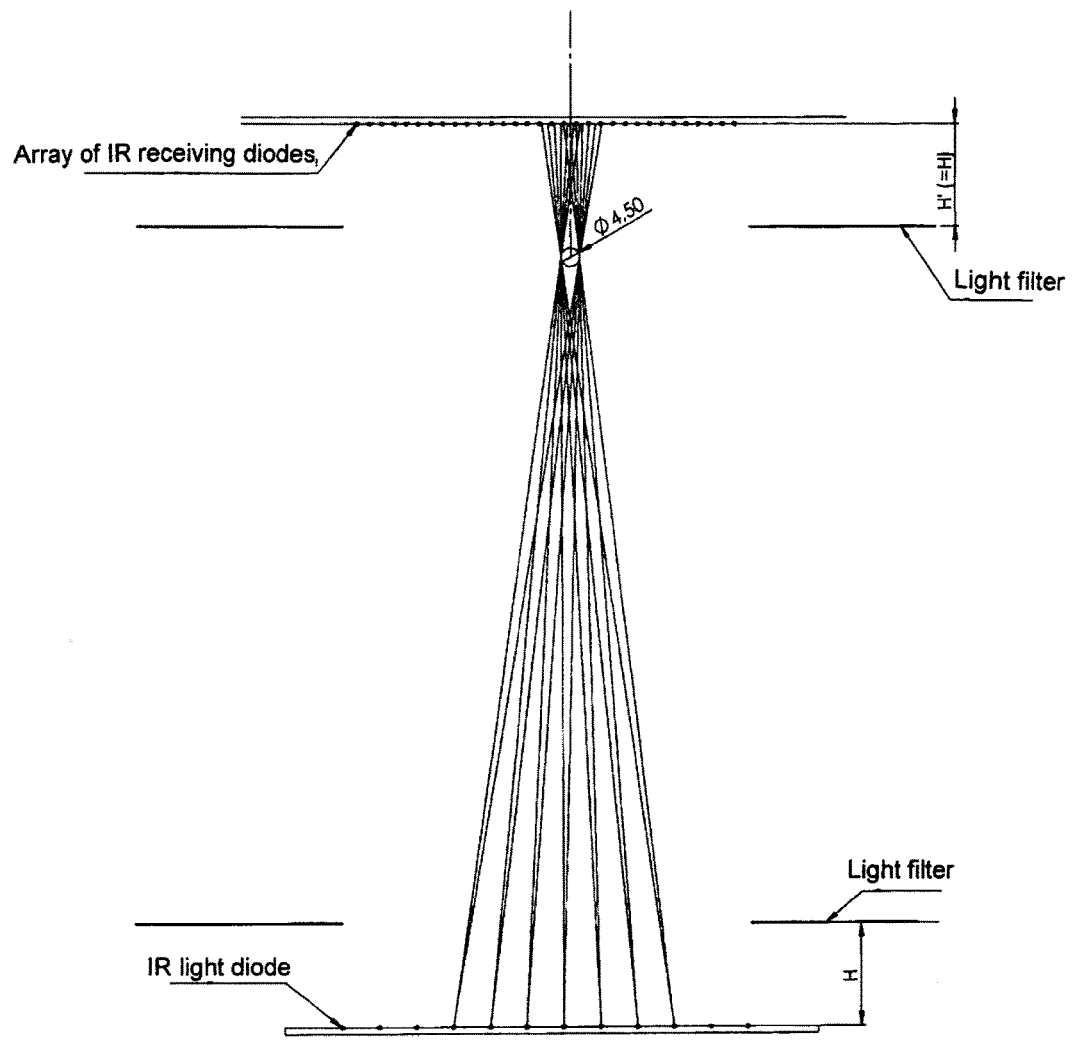
Figure 6C:
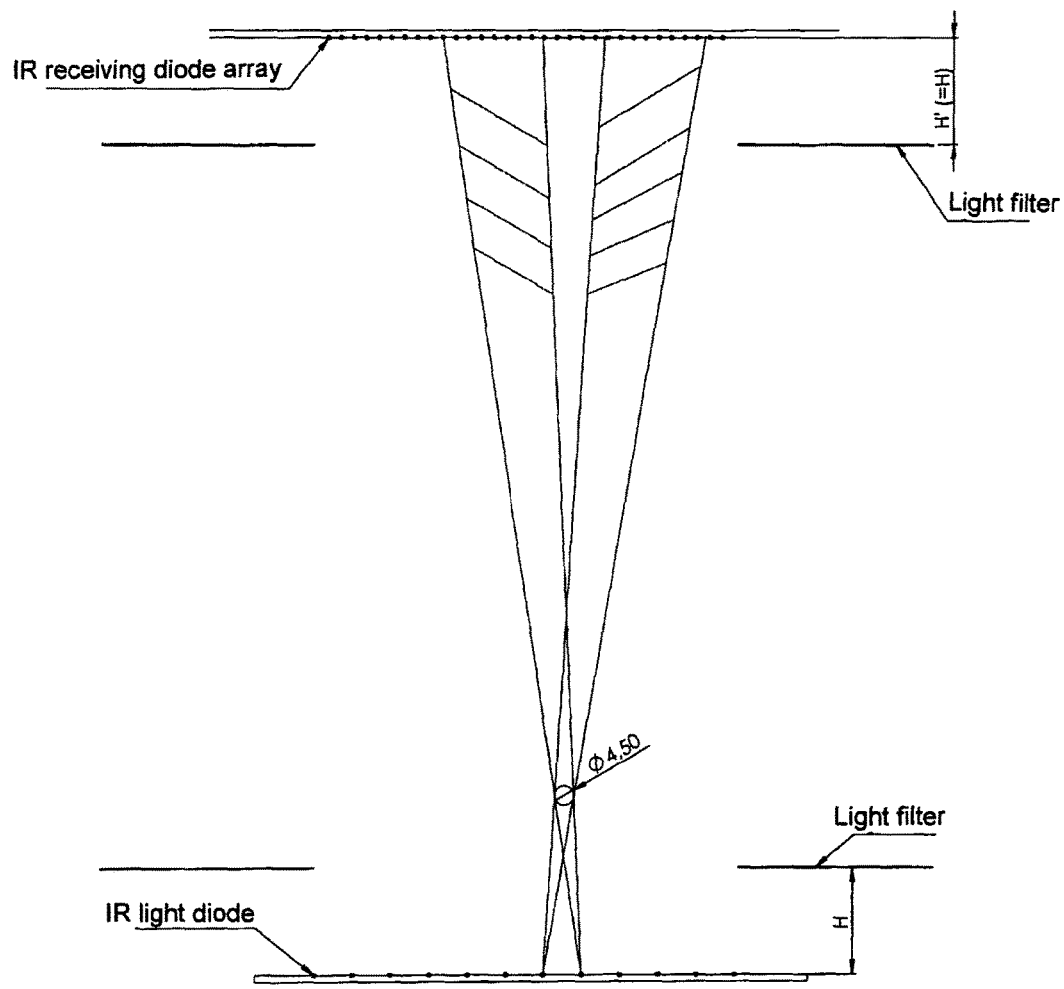

The overlapping, non-planar light shown in FIG. 5A will cause the bullet projectile to cast several shadows, so that an overall diffuse shadow is obtained. FIGS. 6A-6C shows how the extent of the shadow cast by the bullet depends on the position of the bullet as it crosses the light curtain. The light striking the bullet and the shadow cast thereby are shown in the drawings with lines and hatching for shadows.

The light from at least one, but usually several, light diodes strikes the bullet and the shadow drops onto one or more receiving diodes. When the bullet projectile enters and then exits the light curtain, the light intensity will change for the shaded receiving diodes and consequently the current generated thereof will change. The voltage change occurring across a resistance may be increased. This voltage change may be detected by way of a simple comparator or using more complex signal analysis equipment, or the like, so that it will be possible to sample and/or detect several points and/or analyse signal strength changes by means of said signal analysis equipment, which may include at least one embedded CPU/processor.

Figure 7:
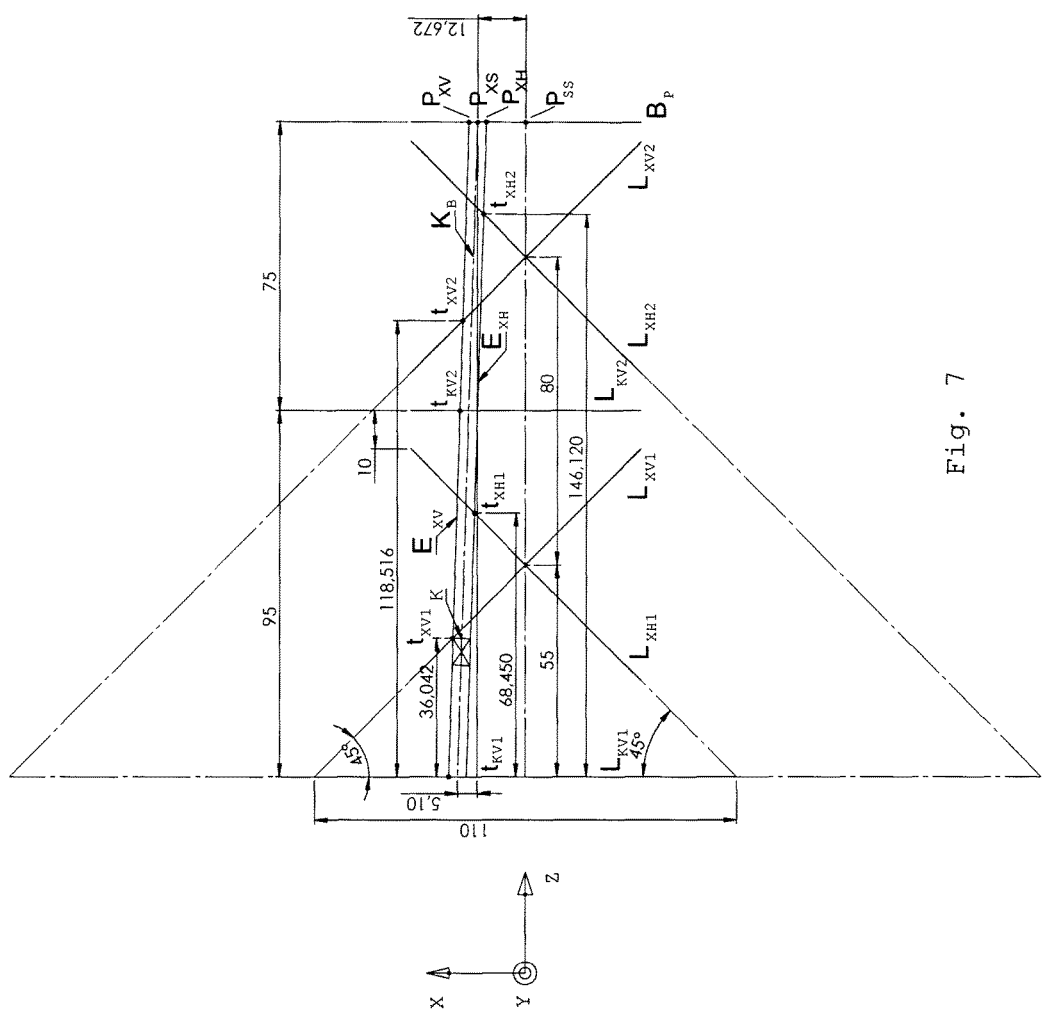
FIG. 7 shows a bullet trajectory through a target disc arrangement with the light plane pattern shown in FIG. 3A.

In a more general bullet detection method it can't be assumed that the bullet trajectory is perpendicular to the target plane, and parallax error must be corrected. The ISSF (International Shooting Sport Federation) demands that for 10 m air rifle, the precision requirement shall be met even if the shooter moves ±0.3 m sideways relative to the line perpendicular to the target plane through the shooting disc plane centre, $P_{SS}$. FIG. 7 shows the bullet trajectory $K_B$ through a 170 mm depth target disc/target disc arrangement with the light plane pattern shown in FIG. 3A, for the border-line case in which the shooter is located 0,3 m to the side of the centre line of the shooting disc. Geometrical calculations show that the bullet K will cross the first light plane, $L_{KV1}$, at a distance of 5.1 mm from the line perpendicular to target plane $B_P$ through the impact point $P_S$ of the bullet; x=(300 mm*170 mm)/10000mm=5.1 mm.

From the shooting disc and assembly/system structure the locations of the different light planes are known. In the exemplary embodiment of FIG. 7, the distance between the two vertical, parallel light planes, $L_{KV1}$ and $L_{KV2}$, is 95 mm. Light planes $L_{XH1}$ and $L_{XH2}$ are parallel and form an angle of 45° with $L_{KV1}$. Light planes $L_{XV1}$ and $L_{XV2}$ are parallel and form an angle of −45° (135°) with $L_{KV1}$. If the x-axis is shifted to one of the intersections of the light planes with $L_{KV1}$, a 45° angle will make the x-values equal to the z-values. In the more general case, for an angle a, x=z/tan(a). This simplifies the calculations necessary.

It is assumed that the real bullet velocity is v=160 m/s=0.16 mm/μs. It is not necessary to know this velocity, but we take this velocity as a base to demonstrate this fact. As the bullet trajectory $K_B$ is not orthogonal to planes $L_{KV1}$ and $L_{KV2}$, the bullet K will travel a longer distance than the 95 mm said planes. From FIG. 7 this real travelled distance can be calculated.

and $L_{KV2}$, it is not necessary to know neither the position of the shooter nor the real bullet velocity to calculate where the bullet K penetrated the light planes.

Column K shows how many millimetres the coordinate system must be offset in x-direction for the relation x=z/tan (a) to apply, with the angle a=45° in this case. The x-coordinates calculated for the points at which the bullet was detected is listed in column L. Due to the oblique trajectory of the bullet, there will be a difference between the x-values calculated at parallel planes, which is indicated in column M. The distance in z-direction between corresponding measuring points is listed in column N, and the distance between target plane $B_P$ and the last measuring point of the right and left bullet edges are listed in column O. With this, all information needed to calculate the parallax error between the last light planes and the shooting disc plane $B_P$, shown in column P, is available; the distance between the point of impact $P_{XV}/P_{XH}$ of the lateral line $E_{XV}/E_{XH}$ of the bullet in target plane $B_P$ and the line perpendicular to target plane $B_P$ through the last measuring point of the bullet edge in

| | A | B | C | D | E | F | G | H | I |
|---|---|---|---|---|---|---|---|---|---|
| | | | | Fra tegn | | D*D+E*E | rot(F) s' | G/0.16 t målt | 95/H1 vb |
| 1 | t1-t4 | 5,1 | 170 | 95 | 2,85 | 9033,1225 | 95,0427404 | 594,017127 | 0,15992805 |
| 2 | t1-t2 | 5,1 | 170 | 36,042 | 1,08126 | 1300,19489 | 36,0582153 | 225,363845 | 0,15992805 |
| 3 | t1-t5 | 5,1 | 170 | 118,516 | 3,55548 | 14058,6837 | 118,56932 | 741,058251 | 0,15992805 |
| 4 | t1-t3 | 5,1 | 170 | 68,45 | 2,0535 | 4689,61936 | 68,4807956 | 428,004972 | 0,15992805 |
| 5 | t1-t6 | 5,1 | 170 | 146,12 | 4,3836 | 21370,2703 | 146,185739 | 913,66087 | 0,15992805 |
| 6 | | | | | | | | | |

| | J | K | L | M | N | O | P | Q | R |
|---|---|---|---|---|---|---|---|---|---|
| | sb | Offset | x | | | Avst bl | | X BL | XS BL |
| 1 | | | | | | | | | |
| 2 | 36,042 | 55 | 18,958 | | | | | | |
| 3 | 118,516 | 135 | 16,484 | 2,474 | 82,474 | 51,484 | 1,54438267 | 14,9396173 | |
| 4 | 68,45 | 55 | 13,45 | | | | | | |
| 5 | 146,12 | 135 | 11,12 | 2,33 | 77,67 | 23,88 | 0,71636925 | 10,4036307 | |
| 6 | | | | | | | | 4,53598659 | 12,671624 |

The above spreadsheet shows a bit more data than the calculation necessary to locate the point of impact $P_S$ relative to shooting disc centre $P_{SS}$ on the target plane. In column D is indicated the apparent distance travelled by the bullet between $t_{KV1}$ ($t_1$) and the other measured time instants (i.e. the z-coordinate). In column E is listed the change in the bullet trajectory in x-direction between ti and the other time instants. Then, using the pythagorean theorem, the actual distance travelled by the bullet can easily be calculated, as shown in column G. Between the two vertical planes $L_{KV1}$ and $L_{KV2}$, the bullet of the example has travelled approximately 95.0427 mm in approx. 594.0171 μs (column H). The times listed in column H have been calculated using the actual travelled distance (column G) and the real velocity, v=160 m/s. In column I is listed the calculated bullet velocity, which is the apparent distance travelled by the bullet (95 mm) divided by the time actually spent by the bullet. This calculated velocity, therefore, is somewhat lower than the real velocity. Because the relation between distance, velocity, and time is linear, the ratios between apparent and actual distances and velocities will be equal. Thus, when the calculated velocity (column I) is multiplied with the measured time (column H), the result is a correct calculated z-value in column J (in this case equal to the x-value in a shifted coordinate system), which equals the apparent distance travelled (column D). As the values of column J only depend on the measurements and the distance between $L_{KV1}$ question. The x-coordinates of points $P_{XV}$ and $P_{XH}$ are listed in column Q, together with the difference therebetween, and the final x-coordinate x of impact point $P_S$ is listed in column R.

A similar set of measurements is obtained for y which can be calculated in the same manner as for x. With this, the point of impact can be indicated on a 2D monitor screen. The distance between the impact point and shooting disc centre, $P_{SS}$, in the target plane is $r=\sqrt{x^2+y^2}$. This distance will decide the score value of the shot.

As the bullet position is calculated in at least two spatial (3D) points, the bullet trajectory can be extrapolated to the position of the shooter. In this manner shooting on wrong target (cross-fire) can be detected. The position of the shooter and/or the calculated bullet velocity may be displayed together with the indication of the impact point of the bullet on the screen.

In the embodiments that include redundant measurements, this information may be used for indicating whether the detection is accurate. This applies, for example, if the measured bullet width or shadow diameter differs and/or the angles are different for the measured lateral lines for the bullet edges. A further method according to the invention may be to measure the time instant at which the shadow has passed by the light curtain, as opposed to the above description where time instants at which the bullet/bullet shadow first hits the light curtain is detected/measured. This method may also be used for detecting problems with individual measurements associated with the above embodiments and/or may be combined with the time measurements/time detections in the above embodiments. The time differences between the moment the shadow appears and the moment it disappears (i.e. when the bullet K first enters the light curtain and when the bullet K exits the light curtain) becomes a measure for the bullet length based on the measured bullet velocity v and the angle of the light plane. Thus, deviations in expected measured bullet lengths may be used for detecting and notifying any problems with measurements. Also, this may be used for reducing the significance of these points in the calculations and/or for making corrections.

The invention claimed is:

1. A system for determining an impact point of a bullet on a shooting disc or target plane, comprising:
   a set or predetermined pattern of light planes including at least five light curtains or planes in three dimensions, forming at least three light curtains or planes in two dimensions, and
   at least one processor,
   wherein the two-dimensional light curtains or planes, are arranged or located in such a manner that, in one of two unknown coordinates of the centre impact point of the bullet on the shooting disc or target plane, at least two light planes form at least one given angle with the shooting disc or target plane and are located at a predetermined distance from each other, wherein said at least one processor is configured for providing for detection of at least two triggering points of a side of the bullet or trajectory of the bullet when the bullet at least one of first hits and exits each light plane, as well as at least two time measurements at these passages through said at least two light planes, and wherein the at least one processor is further configured for calculating the velocity of the bullet using the difference between the two time measurements of the passage of the bullet through the two light planes which are parallel to each other and arranged at said predetermined distance from each other, and
   wherein at least one light plane at one of two unknown coordinates of the centre impact point of the bullet on the shooting disc or target plane is located so as to not be parallel to said at least two light planes, the at least one processor being configured for providing for detection of at least one triggering point of the bullet or trajectory of the bullet when the bullet at least one of first hits and exits the at least one light plane and at least one time measurement of at least one passage through the at least one light plane, and
   wherein the at least one processor is configured for calculating, in each two dimensional plane, by means of the at least three time measurements of the passage of the bullet through said at least three light planes, the calculated velocity of the bullet, and the known parameters for the positions of the light planes and the target plane, such as distances and angle or angles, at least one of: a left impact point of the bullet on the shooting disc or target plane, a right impact point of the bullet on the shooting disc or target plane, a centre point of the bullet trajectory crossing a light plane, and the centre of the impact point of the bullet on the shooting disc or target plane in each two dimensional plane, to then calculate the centre impact point of the bullet on the shooting disc or target plane in three dimensions using at least one of the known and calculated parameters.

2. The system of claim 1, wherein the at least one light plane is located parallel and proximate to the target plane with a set or predetermined distance between the at least one light plane and the target plane, the processor being configured for correcting the coordinates of the left impact point of the bullet on the shooting disc or target plane or the right impact point of the bullet on the shooting disc or target plane in each two dimensional plane with a size of S/2, to then calculate the centre of the bullet on the target plane, S being the predetermined shadow diameter/two dimensional width of the bullet.

3. The system of claim 1, wherein a first group of at least two light planes are located parallel to each other and form at least one predetermined angle with the shooting disc or target plane, and a second group of at least two light planes are located parallel to each other and form at least one predetermined angle with the shooting disc or target plane, and wherein the at least one processor is configured for calculating the centre of the bullet on the target plane and optionally the angle(s) of the trajectory of the bullet with respect to the target plane, by calculating at least two points in each two dimensional plane for the passage of the centre of the bullet through the light planes.

4. The system of claim 1, wherein the at least one light plane forms at least one predetermined angle with the shooting disc or target plane, wherein said at least one processor is configured for providing for detection of at least one triggering point of the other side of the projectile or trajectory of the bullet as well as at least one time measurement at this at least one passage through the at least one light plane, and wherein said at least one processor is configured for calculating the centre of the bullet on the target plane using the left impact point of the bullet on the shooting disc or target plane and the right impact point of the bullet on the shooting disc or target plane in each two dimensional plane, the one side impact point being calculated by said at least one processor using a first lateral line of the projectile or trajectory of the bullet through the two triggering points at the times of the two time measurements, and the second side impact point being calculated by said at least one processor using a second lateral line of the projectile or trajectory of the bullet which is at least one of calculated and extrapolated parallel to the first lateral line and which, at the at least one time instant, runs through the at least one triggering point of the other side of the bullet.

5. The system of claim 1, further comprising a display means including a screen for displaying on the screen at least one of: the centre impact point of the bullet on the shooting disc or target plane, an error message relating to parallax error, an error message relating to shooting on wrong target, the velocity of the bullet when passing through the target disc arrangement, information on the at least one of measured bullet width and bullet length, indicating any problems with the accuracy in the detection of each individual shot, information on the measured bullet trajectory angle, indicating at least one of the location of the shooter and any problems with the accuracy in the detection of each individual shot, and the position of the shooter at each individual shot relative to the centre line through the centre of the target plane.

6. A method for determining an impact point of a bullet on a shooting disc or target plane, comprising the steps of:
   arranging at least five light curtains or planes having a set or predetermined light plane pattern in three dimensions, forming at least three light curtains or planes in two dimensions, wherein the two-dimensional light curtains or planes are arranged or located in such a manner that, in one of two unknown coordinates of the centre impact point of the bullet on the shooting disc or target plane, at least two light planes form at least one given angle with the shooting disc or target plane and are arranged at a predetermined distance from each other, detecting, by means of at least one processor, at least two triggering points of a side of the projectile or trajectory of the bullet when the bullet at least one of first hits and exits each light plane and at least two time measurements at these passages through said at least two light planes, calculating, by means of said at least one processor, the velocity of the bullet using the two of the time measurements of the passage of the bullet through the two light planes that are parallel to each other and arranged at the predetermined distance from each other, and arranging at least one light plane at one of two unknown coordinates of the centre impact point of the bullet on the shooting disc or target plane so as to not be parallel to said at least two light planes, to thereby detect, by means of said at least one processor, at least one triggering point of the projectile or trajectory of the bullet when the bullet at least one of first hits and exits each light plane and at least one time measurement at this at least one passage through the at least one light plane, and calculating, in each two dimensional plane, at least one of: a left impact point of the bullet on the shooting disc or target plane and a right impact point of the bullet on the shooting disc or target plane, a centre point of the bullet trajectory crossing a light curtain and the centre of the impact point of the bullet on the shooting disc or target plane in each two dimensional plane, by means of said at least one processor and using the at least three time measurements of the passage of the bullet through said at least three light planes, the calculated velocity of the bullet, and the known parameters of the locations of the light planes and the target plane, such as distances and angle(s), to then calculate the centre impact point of the bullet on the shooting disc or target plane in three dimensions using at least one of the known and calculated parameters.

7. The method of claim 6, wherein the at least one light plane is located parallel and proximate to the target plane with a set or predetermined distance between said at least one light plane and the target plane, the method further comprising the step of correcting the coordinates of the left impact point of the bullet on the shooting disc or target plane or the right impact point of the bullet on the shooting disc or target plane in each two dimensional plane with a size of S/2, to then calculate the centre of the bullet on the target plane, S being the predetermined shadow diameter/two dimensional width of the bullet.

8. The method of claim 6, wherein a first group of at least two light planes are located parallel to each other and form at least one predetermined angle with the shooting disc or target plane, and a second group of at least two light planes are located parallel to each other and form at least one predetermined angle with the shooting disc or target plane, and the method further comprising the step of calculating the centre of the bullet on the target plane and optionally the angle(s) of the trajectory of the bullet in relation to the target plane, by calculating at least two points in each two dimensional plane for the passage of the centre of the bullet through the light planes.

9. The method of claim 6, wherein the at least one light plane forms at least one predetermined angle with the shooting disc or target plane, the step of detecting at least one triggering point of the other side of the projectile or trajectory of the bullet and at least one time measurement for this at least one passage through the at least one light plane being configured for calculating the centre of the bullet on the target plane by using the left impact point of the bullet on the shooting disc or target plane and the right impact point of the bullet on the shooting disc or target plane in each two dimensional plane, with the one side impact point being calculated using a first lateral line of the projectile or trajectory of the bullet through the two triggering points at the times of the two time measurements, and the second side impact point being calculated using a second lateral line of the projectile or trajectory of the bullet which is at least one of calculated and extrapolated parallel to the first lateral line and which, at the at least one time instant, runs through the at least one triggering point of the other side of the bullet.

10. The method of claim 6, further comprising at least one of the steps of:
correcting for parallax error, and
calculating the position of the shooter relative to the centre line through the centre of the shooting disc.

11. The method of claim 6, further comprising the step of displaying at least one of: the centre impact point of the bullet on the shooting disc or target plane, an error message relating to parallax error, an error message relating to shooting on wrong target, the velocity of the bullet when passing through the target disc arrangement, information on at least one of measured bullet width and bullet length, indicating any problems with the accuracy in the detection of each individual shot, information on the measured bullet trajectory angle, indicating at least one of the location of the shooter and any problems with the accuracy in the detection of each individual shot, and the position of the shooter at each individual shot relative to the centre line through the centre of the shooting disc.

* * * * *